United States Patent
Kim et al.

(10) Patent No.: US 10,932,175 B2
(45) Date of Patent: Feb. 23, 2021

(54) METHOD FOR RELAY TERMINAL TO SELECT REMOTE TERMINAL WHERE ACCESS CONTROL IS APPLIED DUE TO NETWORK CONGESTION AND RELAY TERMINAL PERFORMING METHOD

(71) Applicant: LG ELECTRONICS INC., Seoul (KR)

(72) Inventors: Jaehyun Kim, Seoul (KR); Laeyoung Kim, Seoul (KR); Sungduck Chun, Seoul (KR)

(73) Assignee: LG Electronics Inc., Seoul (KR)

( * ) Notice: Subject to any disclaimer, the term of this patent is extended or adjusted under 35 U.S.C. 154(b) by 32 days.

(21) Appl. No.: 15/909,445

(22) Filed: Mar. 1, 2018

(65) Prior Publication Data
US 2018/0279195 A1   Sep. 27, 2018

Related U.S. Application Data

(60) Provisional application No. 62/474,121, filed on Mar. 21, 2017.

(51) Int. Cl.
*H04W 36/22* (2009.01)
*H04W 48/16* (2009.01)
(Continued)

(52) U.S. Cl.
CPC .......... *H04W 36/22* (2013.01); *H04W 8/005* (2013.01); *H04W 48/16* (2013.01); *H04W 48/06* (2013.01);
(Continued)

(58) Field of Classification Search
CPC ..... H04W 36/22; H04W 76/14; H04W 8/005; H04W 48/16; H04W 48/06; H04W 88/04
See application file for complete search history.

(56) References Cited

U.S. PATENT DOCUMENTS 9,955,334 B2 *   4/2018   Chen .................. H04W 4/70
2012/0039171 A1*  2/2012   Yamada .............. H04L 47/12
                                                370/232
(Continued)

OTHER PUBLICATIONS

Section 4.5.1.1.2.3.2, 3rd Generation Partnership Project; Technical Specification Group Services and System Aspects; Proximity-based services (ProSe); Stage 2 (Release 15), 3GPP TS 23.303 V15.0.0 (Jun. 2017).

(Continued)

*Primary Examiner* — Jeffrey M Rutkowski
*Assistant Examiner* — Jasper Kwoh
(74) *Attorney, Agent, or Firm* — Dentons US LLP

(57) ABSTRACT

One embodiment of the present invention provides a method for a relay UE to select one of remote UEs when access control is applied due to network congestion. The method includes: receiving an announcement message including first information from at least one of the remote UEs; comparing the first information with second information that the relay UE has; selecting a remote UE transmitting the first information that matches the second information from among the remote UEs when the first information matches the second information; selecting one remote UE from among the remote UEs according to a priority when the first information does not match the second information; and transmitting a response message to the selected remote UE.

13 Claims, 18 Drawing Sheets

(51) Int. Cl.
  *H04W 8/00* (2009.01)
  *H04W 88/04* (2009.01)
  *H04W 48/06* (2009.01)
  *H04W 76/14* (2018.01)
  *H04W 76/45* (2018.01)

(52) U.S. Cl.
  CPC ............ *H04W 76/14* (2018.02); *H04W 76/45* (2018.02); *H04W 88/04* (2013.01)

(56) References Cited

U.S. PATENT DOCUMENTS

| | | | | |
|---|---|---|---|---|
| 2012/0113887 A1* | 5/2012 | Shen | ................ | H04W 36/0033 370/315 |
| 2012/0282922 A1* | 11/2012 | Fodor | ................ | H04W 8/22 455/426.1 |
| 2013/0225190 A1* | 8/2013 | Aoyagi | ................ | H04M 3/436 455/452.1 |
| 2014/0329503 A1* | 11/2014 | Deng | ................ | H04W 12/08 455/411 |
| 2015/0029866 A1* | 1/2015 | Liao | ................ | H04W 4/023 370/241 |
| 2015/0141007 A1* | 5/2015 | Du | ................ | H04W 48/16 455/434 |
| 2015/0304937 A1* | 10/2015 | Kim | ................ | H04W 48/14 370/230 |
| 2015/0333813 A1* | 11/2015 | Liu | ................ | H04W 72/1247 370/329 |
| 2016/0057692 A1* | 2/2016 | Geng | ................ | H04W 48/02 370/329 |
| 2016/0248701 A1* | 8/2016 | Guo | ................ | H04W 4/60 |
| 2016/0337935 A1* | 11/2016 | Patil | ................ | H04W 40/22 |
| 2018/0192258 A1* | 7/2018 | Vempati | ................ | H04W 4/08 |
| 2018/0220356 A1* | 8/2018 | Tenny | ................ | H04W 48/02 |
| 2018/0295556 A1* | 10/2018 | Baek | ................ | H04W 8/20 |

OTHER PUBLICATIONS

Section 4.5.1.1.2.3.4, 3rd Generation Partnership Project; Technical Specification Group Services and System Aspects; Proximity-based services (ProSe); Stage 2 (Release 15), 3GPP TS 23.303 V15.0.0 (Jun. 2017).

* cited by examiner

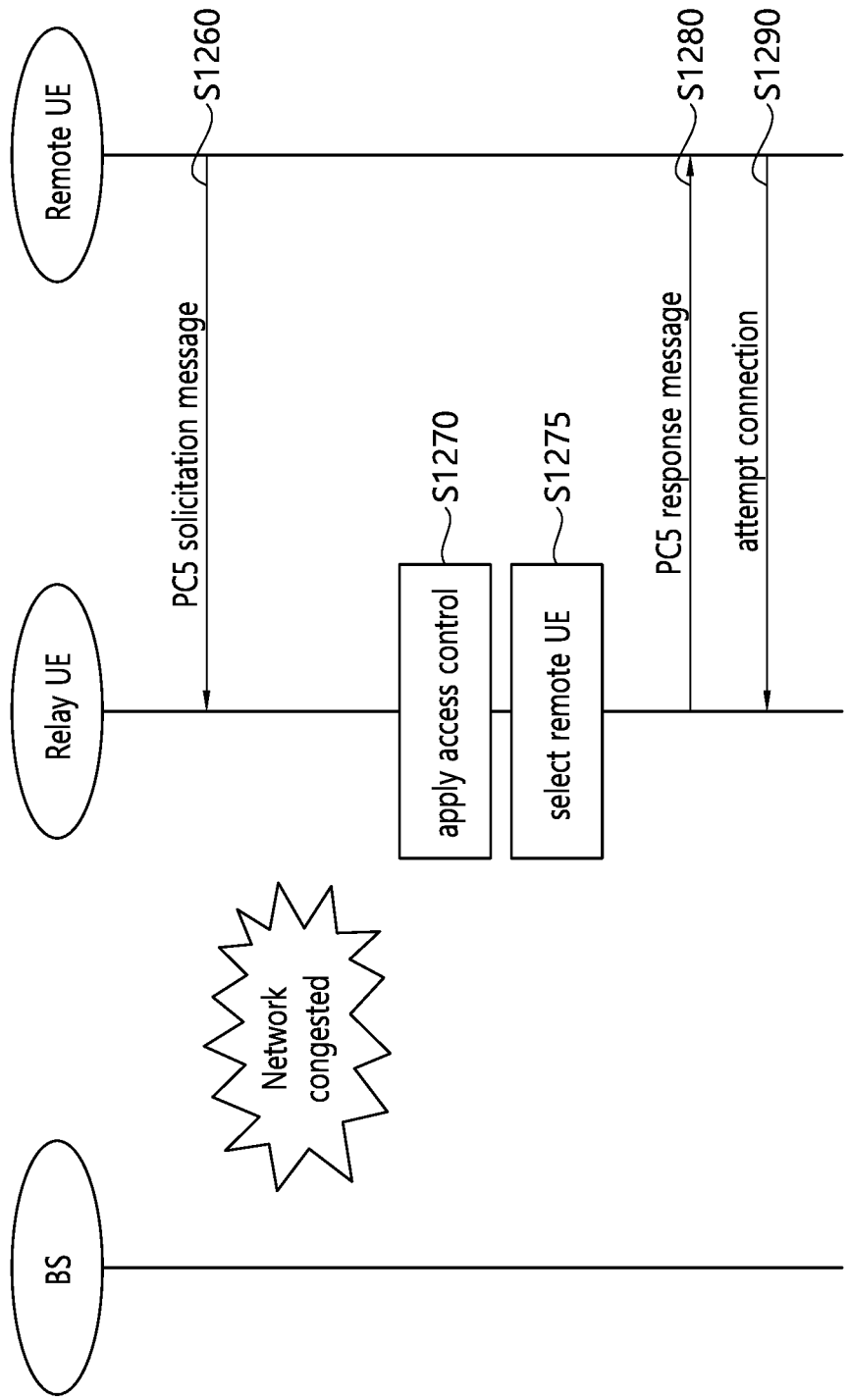

METHOD FOR RELAY TERMINAL TO SELECT REMOTE TERMINAL WHERE ACCESS CONTROL IS APPLIED DUE TO NETWORK CONGESTION AND RELAY TERMINAL PERFORMING METHOD

CROSS-REFERENCE TO RELATED APPLICATIONS

This application claims the benefit of U.S. Provisional Application No. 62/474,121 filed on Mar. 21, 2017, the contents of which are all hereby incorporated by reference herein in their entirety.

BACKGROUND OF THE INVENTION

Field of the Invention

The present invention relates to a method in which a relay UE selects one of remote UEs where access control is applied due to network congestion.

Related Art

In 3GPP in which technical standards for mobile communication systems are established, in order to handle 4th generation communication and several related forums and new technologies, research on Long Term Evolution/System Architecture Evolution (LTE/SAE) technology has started as part of efforts to optimize and improve the performance of 3GPP technologies from the end of the year 2004.

SAE that has been performed based on 3GPP SA WG2 is research regarding network technology that aims to determine the structure of a network and to support mobility between heterogeneous networks in line with an LTE task of a 3GPP TSG RAN and is one of recent important standardization issues of 3GPP. SAE is a task for developing a 3GPP system into a system that supports various radio access technologies based on an IP, and the task has been carried out for the purpose of an optimized packet-based system which minimizes transmission delay with a more improved data transmission capability.

An Evolved Packet System (EPS) higher level reference model defined in 3GPP SA WG2 includes a non-roaming case and roaming cases having various scenarios. A network configuration of FIG. 1 has been briefly reconfigured from the EPS higher level reference model.

FIG. 1 illustrates the configuration of an evolved mobile communication network.

As illustrated, an evolved UMTS terrestrial radio access network (E-UTRAN) is connected to an evolved packet core (EPC). The E-UTRAN is a radio access network defined after 3GPP release-8, and is also called a 4th generation (4G) (i.e., LTE) network. A radio access network before the LTE, i.e., a 3rd generation (3G) radio access network, is a UTRAN.

The E-UTRAN includes a base station (BS) (or eNodeB) 20 which provides a control plane and a user plane to a user equipment (UE). The BSs (or eNodeBs) 20 may be interconnected by means of an X2 interface.

Layers of a radio interface protocol between the UE and the BS (or eNodeB) 20 can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Meanwhile, the EPC may include various constitutional elements. Among them, a mobility management entity (MME) 51, a serving gateway (S-GW) 52, a packet data network gateway (PDN GW) 53, and a home subscriber server (HSS) 54 are illustrated in FIG. 1.

The BS (or eNodeB) 20 is connected to the MME 51 of the EPC through an S1 interface, and is connected to the S-GW 52 through S1-U.

The S-GW 52 is an element that operates at a boundary point between a Radio Access Network (RAN) and a core network and has a function of maintaining a data path between an eNodeB 22 and the PDN GW 53. Furthermore, if a terminal (or UE) moves in a region in which service is provided by the eNodeB 22, the S-GW 52 plays a role of a local mobility anchor point. That is, for mobility within an E-UTRAN (i.e., a Universal Mobile Telecommunications System (Evolved-UMTS) Terrestrial Radio Access Network defined after 3GPP release-8), packets can be routed through the S-GW 52. Furthermore, the S-GW 52 may play a role of an anchor point for mobility with another 3GPP network (i.e., a RAN defined prior to 3GPP release-8, for example, a UTRAN or Global System for Mobile communication (GSM) (GERAN)/Enhanced Data rates for Global Evolution (EDGE) Radio Access Network).

The PDN GW (or P-GW) 53 corresponds to the termination point of a data interface toward a packet data network. The PDN GW 53 can support policy enforcement features, packet filtering, charging support, etc. Furthermore, the PDN GW (or P-GW) 53 can play a role of an anchor point for mobility management with a 3GPP network and a non-3GPP network (e.g., an unreliable network, such as an Interworking Wireless Local Area Network (I-WLAN), a Code Division Multiple Access (CDMA) network, or a reliable network, such as WiMax).

In the network configuration of FIG. 1, the S-GW 52 and the PDN GW 53 have been illustrated as being separate gateways, but the two gateways may be implemented in accordance with a single gateway configuration option.

The MME 51 is an element for performing the access of a terminal to a network connection and signaling and control functions for supporting the allocation, tracking, paging, roaming, handover, etc. of network resources. The MME 51 controls control plane functions related to subscribers and session management. The MME 51 manages numerous eNodeBs 22 and performs conventional signaling for selecting a gateway for handover to another 2G/3G networks. Furthermore, the MME 51 performs functions, such as security procedures, terminal-to-network session handling, and idle terminal location management.

The SGSN handles all packet data, such as a user's mobility management and authentication for different access 3GPP networks (e.g., a GPRS network and an UTRAN/GERAN).

The ePDG serves as a security node for an untrusted non-3GPP network (e.g., an I-WLAN, a Wi-Fi hotspot, or the like).

As can be seen from FIG. 1, a terminal (or UE) having an IP capability may have access to an IP service network (e.g., IMS) provided by a provider (i.e., operator) via various elements in an EPC based on not only a 3GPP access but also a non-3GPP access.

In addition, various reference points (e.g., S1-U, S1-MME, etc.) are illustrated in FIG. 1. In a 3GPP system, a conceptual link for connecting two functions existing in different function entities of the E-UTRAN and the EPC is defined as a reference point. The reference point of FIG. 1 is summarized in Table 1 below. In addition to the examples of Table 1, various reference points may exist according to a network structure.

TABLE 1

| Reference Point | Description |
| --- | --- |
| S1-MME | Reference point for the control plane protocol between E-UTRAN and MME |
| S1-U | Reference point between E-UTRAN and Serving GW for the per bearer user plane tunnelling and inter eNodeB path switching during handover |
| S3 | It enables user and bearer information exchange for inter 3GPP access network mobility in Idle and/or active state. This reference point can be used intra-PLMN or inter-PLMN (e.g. in the case of Inter-PLMN HO) |
| S4 | It provides related control and mobility support between GPRS Core and the 3GPP Anchor function of Serving GW. In addition, if Direct Tunnel is not established, it provides the user plane tunnelling. |
| S5 | It provides user plane tunnelling and tunnel management between Serving GW and PDN GW. It is used for Serving GW relocation due to UE mobility and if the Serving GW needs to connect to a non-collocated PDN GW for the required PDN connectivity. |
| S11 | A reference point between the MME and the S-GW |
| SGi | It is the reference point between the PDN GW and the packet data network. Packet data network may be an operator external public or private packet data network or an intra operator packet data network, e.g. for provision of IMS services. This reference point corresponds to Gi for 3GPP accesses. |

Among the reference points illustrated in FIG. 1, S2a and S2b are a non-3GPP interface. S2a is a reference point that provides the user plane with related control and mobility support between trusted non-3GPP access and the PDN GW. S2b is a reference point that provides the user plane with related control and mobility support between the ePDG and the PDN GW.

FIG. 2 is an exemplary diagram illustrating the architecture of a common E-UTRAN and a common the EPC.

As illustrated in FIG. 2, the eNodeB 20 can perform functions, such as routing to a gateway while RRC connection is activated, the scheduling and transmission of a paging message, the scheduling and transmission of a broadcast channel (BCH), the dynamic allocation of resources to a UE in uplink and downlink, a configuration and providing for the measurement of the eNodeB 20, control of a radio bearer, radio admission control, and connection mobility control. The EPC can perform functions, such as the generation of paging, the management of an LTE_IDLE state, the ciphering of a user plane, control of an EPS bearer, the ciphering of NAS signaling, and integrity protection.

FIG. 3 is an exemplary diagram illustrating the structure of a radio interface protocol in a control plane between a UE and an eNodeB, and FIG. 4 is another exemplary diagram illustrating the structure of a radio interface protocol in a control plane between a UE and an eNodeB.

The radio interface protocol is based on a 3GPP radio access network standard. The radio interface protocol includes a physical layer, a data link layer, and a network layer horizontally, and it is divided into a user plane for the transmission of information and a control plane for the transfer of a control signal (or signaling).

The protocol layers may be classified into a first layer (L1), a second layer (L2), and a third layer (L3) based on three lower layers of the Open System Interconnection (OSI) reference model that is widely known in communication systems.

The layers of the radio protocol of the control plane illustrated in FIG. 3 and the radio protocol in the user plane of FIG. 4 are described below.

The physical layer PHY, that is, the first layer, provides information transfer service using physical channels. The PHY layer is connected to a Medium Access Control (MAC) layer placed in a higher layer through a transport channel, and data is transferred between the MAC layer and the PHY layer through the transport channel. Furthermore, data is transferred between different PHY layers, that is, PHY layers on the transmiter side and the receiver side, through the PHY layer.

A physical channel is made up of multiple subframes on a time axis and multiple subcarriers on a frequency axis. Here, one subframe is made up of a plurality of symbols and a plurality of subcarriers on the time axis. One subframe is made up of a plurality of resource blocks, and one resource block is made up of a plurality of symbols and a plurality of subcarriers. A Transmission Time Interval (TTI), that is, a unit time during which data is transmitted, is 1 ms corresponding to one subframe.

In accordance with 3GPP LTE, physical channels that are presented in the physical layer of the transmiter side and the receiver side can be divided into a Physical Downlink Shared Channel (PDSCH) and a Physical Uplink Shared Channel (PUSCH), that is, data channels, and a Physical Downlink Control Channel (PDCCH), a Physical Control Format Indicator Channel (PCFICH), a Physical Hybrid-ARQ Indicator Channel (PHICH), and a Physical Uplink Control Channel (PUCCH), that is, control channels.

A PCFICH that is transmitted in the first OFDM symbol of a subframe carries a Control Format Indicator (CFI) regarding the number of OFDM symbols (i.e., the size of a control region) used to transmit control channels within the subframe. A wireless device first receives a CFI on a PCFICH and then monitors PDCCHs.

Unlike a PDCCH, a PCFICH is transmitted through the fixed PCFICH resources of a subframe without using blind decoding.

A PHICH carries positive-acknowledgement (ACK)/negative-acknowledgement (NACK) signals for an uplink (UL) Hybrid Automatic Repeat reQuest (HARQ). ACK/NACK signals for UL data on a PUSCH that is transmitted by a wireless device are transmitted on a PHICH.

A Physical Broadcast Channel (PBCH) is transmitted in four former OFDM symbols of the second slot of the first subframe of a radio frame. The PBCH carries system information that is essential for a wireless device to communicate with an eNodeB, and system information transmitted through a PBCH is called a Master Information Block (MIB). In contrast, system information transmitted on a PDSCH indicated by a PDCCH is called a System Information Block (SIB).

A PDCCH can carry the resource allocation and transport format of a downlink-shared channel (DL-SCH), information about the resource allocation of an uplink shared channel (UL-SCH), paging information for a PCH, system information for a DL-SCH, the resource allocation of an upper layer control message transmitted on a PDSCH, such as a random access response, a set of transmit power control commands for individual UEs within a specific UE group, and the activation of a Voice over Internet Protocol (VoIP). A plurality of PDCCHs can be transmitted within the control region, and UE can monitor a plurality of PDCCHs. A PDCCH is transmitted on one Control Channel Element (CCE) or an aggregation of multiple contiguous CCEs. A CCE is a logical allocation unit used to provide a PDCCH with a coding rate according to the state of a radio channel A CCE corresponds to a plurality of resource element groups. The format of a PDCCH and the number of bits of a possible PDCCH are determined by a relationship between the number of CCEs and a coding rate provided by CCEs.

Control information transmitted through a PDCCH is called Downlink Control Information (DCI). DCI can include the resource allocation of a PDSCH (also called a downlink (DL) grant)), the resource allocation of a PUSCH (also called an uplink (UL) grant), a set of transmit power control commands for individual UEs within a specific UE group, and/or the activation of a Voice over Internet Protocol (VoIP).

Several layers are presented in the second layer. First, a Medium Access Control (MAC) layer functions to map various logical channels to various transport channels and also plays a role of logical channel multiplexing for mapping multiple logical channels to one transport channel. The MAC layer is connected to a Radio Link Control (RLC) layer, that is, a higher layer, through a logical channel. The logical channel is basically divided into a control channel through which information of the control plane is transmitted and a traffic channel through which information of the user plane is transmitted depending on the type of transmitted information.

The RLC layer of the second layer functions to control a data size that is suitable for transmitting, by a lower layer, data received from a higher layer in a radio section by segmenting and concatenating the data. Furthermore, in order to guarantee various types of QoS required by radio bearers, the RLC layer provides three types of operation modes: a Transparent Mode (TM), an Un-acknowledged Mode (UM), and an Acknowledged Mode (AM). In particular, AM RLC performs a retransmission function through an Automatic Repeat and Request (ARQ) function for reliable data transmission.

The Packet Data Convergence Protocol (PDCP) layer of the second layer performs a header compression function for reducing the size of an IP packet header containing control information that is relatively large in size and unnecessary in order to efficiently transmit an IP packet, such as IPv4 or IPv6, in a radio section having a small bandwidth when transmitting the IP packet. Accordingly, transmission efficiency of the radio section can be increased because only essential information is transmitted in the header part of data. Furthermore, in an LTE system, the PDCP layer also performs a security function. The security function includes ciphering for preventing the interception of data by a third party and integrity protection for preventing the manipulation of data by a third party.

A Radio Resource Control (RRC) layer at the highest place of the third layer is defined only in the control plane and is responsible for control of logical channels, transport channels, and physical channels in relation to the configuration, re-configuration, and release of Radio Bearers (RBs). Here, the RB means service provided by the second layer in order to transfer data between a UE and an E-UTRAN.

If an RRC connection is presented between the RRC layer of a UE and the RRC layer of a wireless network, the UE is in an RRC_CONNECTED state. If not, the UE is in an RRC_IDLE state.

An RRC state and an RRC connection method of UE are described below. The RRC state means whether or not the RRC layer of a UE has been logically connected to the RRC layer of an E-UTRAN. If the RRC layer of the UE is logically connected to the RRC layer of an E-UTRAN, it is called the RRC_CONNECTED state. If the RRC layer of UE is not logically connected to the RRC layer of an E-UTRAN, it is called the RRC_IDLE state. Since the UE in the RRC_CONNECTED state has an RRC connection, an E-UTRAN can check the existence of the UE in a cell unit, and thus control the UE effectively. In contrast, if the UE is in the RRC_IDLE state, an E-UTRAN cannot check the existence of the UE, and a core network manages the UE in a Tracking Area (TA) unit, that is, an area unit greater than a cell. That is, only the existence of a UE in the RRC_IDLE state is checked in an area unit greater than a cell. In such a case, the UE needs to shift to the RRC_CONNECTED state in order to be provided with common mobile communication services, such as voice or data services. Each TA is classified through Tracking Area Identity (TAI). A UE can configure TAI through Tracking Area Code (TAC), that is, information broadcasted by a cell.

When a user first turns on the power of a UE, the UE first searches for a proper cell, establishes an RRC connection in the corresponding cell, and registers information about the UE with a core network. Thereafter, the UE stays in the RRC_IDLE state. The UE in the RRC_IDLE state (re) selects a cell if necessary and checks system information or paging information. This process is called camp on. When the UE in the RRC_IDLE state needs to establish an RRC connection, the UE establishes an RRC connection with the RRC layer of an E-UTRAN through an RRC connection procedure and shifts to the RRC_CONNECTED state. A case where the UE in the RRC_IDLE state needs to establish with an RRC connection includes multiple cases. The multiple cases may include, for example, a case where UL data needs to be transmitted for a reason, such as a call attempt made by a user and a case where a response message needs to be transmitted in response to a paging message received from an E-UTRAN.

A Non-Access Stratum (NAS) layer placed over the RRC layer performs functions, such as session management and mobility management.

The NAS layer illustrated in FIG. 3 is described in detail below.

Evolved Session Management (ESM) belonging to the NAS layer performs functions, such as the management of default bearers and the management of dedicated bearers, and ESM is responsible for control that is necessary for UE to use PS service from a network. Default bearer resources are characterized in that they are allocated by a network when a UE first accesses a specific Packet Data Network (PDN) or accesses a network. Here, the network allocates an IP address available for UE so that the UE can use data service and the QoS of a default bearer. LTE supports two types of bearers: a bearer having Guaranteed Bit Rate (GBR) QoS characteristic that guarantees a specific bandwidth for the transmission and reception of data and a non-GBR bearer having the best effort QoS characteristic without guaranteeing a bandwidth. A default bearer is assigned a non-GBR bearer, and a dedicated bearer may be assigned a bearer having a GBR or non-GBR QoS characteristic.

In a network, a bearer assigned to a UE is called an Evolved Packet Service (EPS) bearer. When assigning an EPS bearer, a network assigns one ID. This is called an EPS bearer ID. One EPS bearer has QoS characteristics of a Maximum Bit Rate (MBR) and a Guaranteed Bit Rate (GBR) or an Aggregated Maximum Bit Rate (AMBR).

Meanwhile, in FIG. 3, the RRC layer, the RLC layer, the MAC layer, and the PHY layer placed under the NAS layer are also collectively called an Access Stratum (AS).

FIG. 5a is a flowchart illustrating a random access process in 3GPP LTE.

The random access process is used for a UE 10 to obtain UL synchronization with a BS, that is, an eNodeB 20, or to be assigned UL radio resources.

The UE 10 receives a root index and a physical random access channel (PRACH) configuration index from the eNodeB 20. 64 candidate random access preambles defined by a Zadoff-Chu (ZC) sequence are presented in each cell. The root index is a logical index that is used for the UE to generate the 64 candidate random access preambles.

The transmission of a random access preamble is limited to specific time and frequency resources in each cell. The PRACH configuration index indicates a specific subframe on which a random access preamble can be transmitted and a preamble format.

The UE 10 transmits a randomly selected random access preamble to the eNodeB 20. Here, the UE 10 selects one of the 64 candidate random access preambles. Furthermore, the UE selects a subframe corresponding to the PRACH configuration index. The UE 10 transmits the selected random access preamble in the selected subframe.

The eNodeB 20 that has received the random access preamble transmits a Random Access Response (RAR) to the UE 10. The random access response is detected in two steps. First, the UE 10 detects a PDCCH masked with a random access-RNTI (RA-RNTI). The UE 10 receives a random access response within a Medium Access Control (MAC) Protocol Data Unit (PDU) on a PDSCH that is indicated by the detected PDCCH.

FIG. 5b illustrates a connection process in an RRC layer.

FIG. 5b illustrates an RRC state depending on whether an RRC connection is established. The RRC state indicates whether an entity in the RRC layer of a UE 10 is logically connected to an entity in the RRC layer of an eNodeB 20. A state in which the entities are connected is referred to as an RRC-connected state, and a state in which the entities are not connected is referred to as an RRC-idle state.

Since the UE 10 in the connected state has an RRC connection, an E-UTRAN can check the existence of the UE in a cell unit and thus can effectively control the UE 10. However, the UE 10 in the idle state cannot be checked by the eNodeB 20 but is managed by a core network in a unit of Tracking Area, which is an area unit larger than a cell. The Tracking Area is a set of cells. That is, if the UE 10 is in the idle state, only the existence of the UE 10 is identified in a large area unit. In order to receive normal mobile communication services, such as voice or data services, the UE needs to shift to the connected state.

When a user first turns on the power of the UE 10, the UE 10 first searches for an appropriate cell and stays in the idle state in the cell. When the UE 10 staying in the idle state needs to establish an RRC connection, the UE 10 establishes an RRC connection with the RRC layer of the eNodeB 20 through an RRC connection procedure and shifts to the connected state.

The UE in the idle state needs to establish an RRC connection in many cases, for example, when the UE attempts a call, needs to transmit uplink data, or needs to transmit a response message in response to a paging message received from an EUTRAN.

As mentioned above, an RRC connection procedure is needed for the UE 10 in the idle state to establish an RRC connection with the eNodeB 20. The RRC connection procedure generally includes a process in which the UE 10 transmits an RRC connection request message to the eNodeB 20, a process in which the eNodeB 20 transmits an RRC connection setup message to the UE 10, and a process in which the UE 10 transmits an RRC connection setup complete message to the eNodeB 20, which are described in detail below with reference to FIG. 5b.

1) When the UE 10 in the idle state wishes to establish an RRC connection for a reason, for example, to make a call, to transmit data, or to transmit a response to paging of the eNodeB 20, the UE 10 first transmits an RRC connection request message to the eNodeB 20.

2) Upon receiving the RRC connection request message from the UE 10, when radio resources are sufficient, the eNB 20 accepts an RRC connection request from the UE 10 and transmits an RRC connection setup message, which is a response message, to the UE 10.

3) Upon receiving the RRC connection setup message, the UE 10 transmits an RRC connection setup complete message to the eNodeB 20. When the RRC connection setup complete message is successfully transmitted, the RRC connection between the UE 10 and the eNodeB 20 is established and the UE 10 shifts to an RRC-connected mode.

FIG. 6 illustrates a network overload situation.

As illustrated in FIG. 6, there are a large number of UEs 100a, 100b, 100c, and 100d in the coverage of an eNodeB 200, which attempt to transmit and receive data. Thus, when traffic overload or congestion occurs at an interface between the eNodeB 200 and an S-GW 520, transmission of downlink data to the UE 100 or transmission of uplink data from the UE 100 cannot be properly performed but fails.

Also, overload or congestion occurs at an interface between the S-GW 520 and a PDN-GW 530 or an interface between the PDN-GW 530 and an Internet Protocol (IP) service network of a mobile communication service provider, transmission of downlink data to the UEs 100a, 100b, 100c, and 100d or transmission of uplink data from the UEs 100a, 100b, 100c, and 100d cannot be properly performed but fails.

When there is overload or congestion in the interface between the eNodeB 200 and the S-GW 520 or there is overload or congestion in the interface between the S-GW 520 and the PDN-GW 530, a node of (e.g., an MME) a core network performs NAS-level congestion control to avoid or control signaling congestion and APN congestion.

The NAS-level congestion control includes APN-based congestion control and general NAS-level mobility management control.

The APN-based congestion control refers to EMM, GMM and (E)SM signal congestion control related to a UE and a particular APN (an APN associated with a congestion situation), and includes APN-based session management congestion control and APN-based mobility management congestion control.

The general NAS-level mobility management control refers to control in which a node (an MME or SGSN) of a core network rejects a mobility management signaling request from a UE/MS in a general network congestion or an overload situation to thereby avoid congestion and overload.

Generally, when the core network performs NAS-level congestion control, the core network transmits a delay time timer (back-off timer) value to a UE in an idle mode or a connected mode via an NAS reject message, and the UE does not request an EMM/GMM/(E) SM signal from the network until a delay time timer (back-off) timer expires. The NAS reject message is one of an attach rejection message, a tracking area update (TAU) rejection message, a routing area update (RAU) rejection message, a service rejection message, an extended service rejection message, a PDN connectivity rejection message, a bearer resource allocation rejection message, a bearer resource modification rejection message, and an EPS bearer context deactivation request message.

The back-off timer may be divided into a mobility management (MM) back-off timer and a session management (SM) back-off timer.

The MM back-off timer operates independently for each UE, and the SM back-off timer operates independently for each APN and each UE.

Briefly, the MM back-off timer is for controlling EMM/GMM signals (e.g., attach and TAU/RAU requests). The SM back-off time is for controlling an (E)SM signal (e.g., PDN connectivity, bearer resource allocation, bearer modification, PDP context activation, and PDP context modification requests).

Specifically, the MM back-off timer is a mobility-related back-off timer used to control congestion occurring in the network. While this timer is operating, the UE is not allowed to perform procedures for attach, location information update (TAU and RAU), and service requests. Here, in the case of an emergency bearer service or a multimedia priority service (MPS), the UE may exceptionally be allowed to make such requests even though the timer is operating.

As described above, the UE may receive an MM back-off timer value from the node (e.g., the MME or SGSN) of the core network or from a lower layer (Access Stratum). Also, the UE may set the MM back-off timer to a random value ranging from 15 minutes to 30 minutes.

The SM back-off timer is a session management-related back-off timer used to control congestion occurring in the network. While this timer is operating, the UE is not allowed to establish or change an associated APN-based session. Likewise, in the case of an emergency bearer service or a multimedia priority service (MPS), the UE 100 may exceptionally be allowed to make such requests even though the timer is operating.

The UE receives an SM back-off timer value from the node (e.g., the MME or SGSN) of the core network, in which the SM back-off timer value is set randomly within up to 72 hours. Also, the UE 100 may set the MM back-off timer to a random value ranging from 15 minutes to 30 minutes.

Meanwhile, when congestion occurs in the eNodeB 200, the eNodeB 200 can also perform congestion control. That is, when the UE transmits an RRC connection establishment request for data transmission on a user plane, if the eNodeB 200 is congested, the eNodeB 200 may transmit a response of rejection to the UE along with an extended wait timer. In this case, the UE is not allowed to reattempt an RRC connection establishment request until the extended wait timer expires. However, when the UE makes an RRC connection request to transmit a control-plane signal for receiving a circuit-switched (CS) call, the eNodeB 200 is not allowed to reject the request even though the eNodeB 200 is congested.

FIG. 7 is an exemplary flowchart illustrating an access barring operation in a network congestion state.

As illustrated in FIG. 7, in an overloaded or congested state of a network or an eNodeB 200, the eNodeB 200 may broadcast access class barring (ACB)-related information through system information. The system information may be system information block (SIB) type 2.

SIB type 2 may include ACB-related information illustrated in the following table.

TABLE 2

| Field | Description |
|---|---|
| ac-BarringFactor | When a random value generated by a UE is smaller than the value of ac-BarringFactor, access is allowed. Otherwise, access is barred. |
| ac-BarringForCSFB | Represents ACB for circuit-switched (CS) fallback. CS fallback converts a VoLTE call into a previous 3G call. |
| ac-BarringForEmergency | Represents ACB for emergency service. |
| ac-BarringForMO-Data | Represents ACB for mobile originating (MO) data. |
| ac-BarringForMO-Signaling | Represents ACB for MO control signal. |
| ac-BarringForSpecialAC | Represents ACB for special access classes, that is, 11 to 15. |
| ac-BarringTime | Represents time in which access is barred. |
| ssac-BarringForMMTEL-Video | Represents service-specific ACB for MO of MMTEL video. |
| ssac-BarringForMMTEL-Voice | Represents service-specific ACB for MO of MMTEL voice. |

UE1 100a determines to originate an IMS service, for example, a VoLTE call, and generates a service request message. Likewise, UE2 100b determines to originate general data and generates a service request message.

Sequentially, UE1 100a generates an RRC connection request message. Likewise, UE2 100b generates an RRC connection request message.

Meanwhile, UE1 100a performs an access barring check (that is, checks whether ACB is applied). Likewise, UE2 100b performs an access barring check (that is, checks whether ACB is applied).

When ACB is not applied, each of UE1 100a and UE2 100b may transmit a service request (or an extended service request) message and an RRC connection request message. However, when ACB is applied, both UE1 100a and UE2 100b cannot transmit an RRC connection request message.

The access barring check is described in detail as follows. Generally, a UE is randomly allocated at least one of 10 access classes (e.g., AC0, AC1, . . . , and AC9). Exceptionally, the UE is allocated AC10 for urgent emergency access. The value of the randomly allocated access class may be stored in a USIM of each of UE1 100a and UE2 100b. UE1 100a and UE2 100b check whether access barring is applied, using a barring factor field included in the received ACB-related information, based on the stored access class. The access barring check is performed in an AS layer, that is, an RRC layer, of each of UE1 100a and UE2 100b.

The access barring check is described in more detail as follows.

When SIB type 2 received by each of UE1 100a and UE2 100b includes an ac-BarringPerPLMN-List and the ac-BarringPerPLMN-List includes an AC-BarringPerPLMN entry matched with a plmn-identityIndex corresponding to a PLMN selected by a higher layer, UE1 100a and UE2 100b selects the AC-BarringPerPLMN entry matched with the plmn-identityIndex corresponding to the PLMN selected by the higher layer.

To make an RRC connection request, UE1 100a and UE2 100b performs an access barring check using T303 as Tbarring and using ac-BarringForMO-Data as a barring parameter.

When it is determined that access is barred, the AS layer (that is, the RRC layer) of each of UE1 100a and UE2 100b reports the failure of RRC connection establishment to the higher layer.

When access is barred, the AS layer (that is, the RRC layer) determines whether a T302 timer or a Mbarring timer is operating. When the timers are not operating, the T302 timer or the Tbarring timer is operated.

While the T302 timer or the Tbarring timer is operating, the AS layer (that is, the RRC layer) considers that all access to a corresponding cell is barred.

As described above, in the case of network overload and congestion, an eNB/RNC provides ACB-related information to a UE. Then, the UE checks access barring using a barring factor included in the received ACB information based on an access class thereof stored in a USIM. As a result of an access barring check, the UE may not finally attempt access attempt. That is, as a result of the access barring check, when access to a corresponding cell is barred, the UE does not attempt access, and when access to the corresponding cell is not barred, the UE attempts access. The access barring check is performed in the AS layer of the UE. Herein, an access attempt means that the AS (RRC) layer of the UE transmits an RRC connection request message to the eNB/RNC.

Meanwhile, the access barring check for ACB is performed regarding general mobile originating (MO) services for the UE, for example, originating a call, originating data, originating an IMS voice, and originating an IMS video. That is, ACB is applied to access to all application programs (except for an emergency service or a response to paging). Therefore, when it is determined that ACB is applied, access the UE to all applications (except for an emergency service or a response to paging) is completely barred.

Accordingly, an application-specific congestion control for data communication (ACDC) has been proposed in order to differentiate particular application group/category-specific MO services (e.g., call origination or data origination) in the case of network overload and congestion. According to ACDC, it is possible to allow or bar each service requested by an application running on a UE in a differentiated manner.

Meanwhile, a proximity communication service between physically adjacent UEs has been proposed with growing users' demands for social networking services (SNSs). The proximity communication service is also called proximity service (ProSe). In the ProSe, a UE located within the coverage of a BS may serve as a relay UE for a remote UE. That is, the remote UE can receive a network connection service through the relay UE. However, when access control is applied due to network congestion, the remote UE may not establish an RRC connection or may not use a particular service and/or application.

Here, when network congestion occurs, the remote UE may request a network connection service even without recognizing the situation of network congestion, thereby unnecessarily wasting resources, consuming the battery, and causing a delay in service connection. Further, it is not clarified in the current 3GPP specifications whether access control is performed by the remote UE or the relay UE when network congestion occurs.

SUMMARY OF THE INVENTION

Therefore, the disclosure of the present invention is aimed at presenting a method for solving the foregoing problems. Specifically, one aspect of the present invention is aimed at providing a method for a relay UE to select a remote UE when access control is applied due to network congestion, and a relay UE performing the method.

To achieve the foregoing aspect, according to one embodiment, there is provided a method for a relay UE to select one of remote UEs when access control is applied due to network congestion. The method may include: receiving an announcement message including first information from at least one of the remote UEs; comparing the first information with second information that the relay UE has; selecting a remote UE transmitting the first information that matches the second information from among the remote UEs when the first information matches the second information; selecting one remote UE from among the remote UEs according to a priority when the first information does not match the second information; and transmitting a response message to the selected remote UE.

The first information may include access class information on the remote UE, access control mechanism information on the remote UE, and configuration information on the remote UE.

The second information may include access class information on the relay UE, access control mechanism information on the relay UE, and configuration information on the relay UE.

The priority may indicate an order of determining whether the access class information, the access control mechanism information, and the configuration information included in the second information match those of the first information.

The selecting of one remote UE from among the remote UEs may include: first determining of determining whether there is a remote UE having the same access class information as that of the relay UE based on the priority; and selecting the remote UE having the same access class information when there is the remote UE having the same access class information as that of the relay UE as a result of the first determining.

The selecting of one remote UE from among the remote UEs may further include: second determining of determining whether there is a remote UE having the same configuration information as that of the relay UE when there is no remote UE having the same access class information as that of the relay UE as a result of the first determining; and selecting the remote UE having the same configuration information when there is the remote UE having the same configuration information as that of the relay UE as a result of the second determining, wherein the configuration information may include at least one of a non-access stratum (NAS) signaling low priority indicator and an overriding NAS signaling low priority indicator.

The selecting of one remote UE from among the remote UEs may further include: third determining of determining whether there is a remote UE having the same extended access barring (EAB) information as that of the access control mechanism information on the relay UE when there is no remote UE having the same configuration information as that of the relay UE as a result of the second determining; and selecting the remote UE having the same EAB information when there is the remote UE having the same EAB information as that of the relay UE as a result of the third determining.

The selecting of one remote UE from among the remote UEs may further include: fourth determining of determining whether there is a remote UE having the same application-specific congestion control for data communication (ACDC) information as that of the access control mechanism information on the relay UE when there is no remote UE having the same EAB information as that of the relay UE as a result of the third determining; and selecting the remote UE having the same ACDC information when there is the remote UE having the same ACDC information as that of the relay UE as a result of the fourth determining.

The response message may include one or more of information on access control, information on a start of access control, and the second information, and any one piece of the response message may be used to report to the remote UE that access control is started by the relay UE.

Even though the remote UE is selected by the relay UE, the remote UE may select a different relay UE, other than the relay UE, based on any one piece of information in the response message.

The first information may include a first relay service code and a first user information identifier (ID) of the remote UE, and the second information may include a second relay service code and a second user information ID of the relay UE.

The selecting of one remote UE from among the remote UEs may include selecting a remote UE having a highest signal strength from among a plurality of remote UEs transmitting the first information entirely matching the second information when there is the plurality of remote UEs transmitting the first information.

The selecting of the remote UE transmitting the first information from among the remote UEs may include selecting a remote UE based on a policy of a service provider or a configuration of a network when there is a plurality of remote UEs transmitting the first information entirely matching the second information.

To achieve the foregoing aspect, according to another embodiment, there is provided a relay UE selecting one of remote UEs when access control is applied due to network congestion. The relay UE may include: a radio frequency (RF) unit to receive an announcement message including first information from at least one of the remote UEs and to transmit a response message to a selected remote UE; and a processor to control the RF unit, wherein the processor: compares the first information with second information that the relay UE has; selects a remote UE transmitting the first information that matches the second information from among the remote UEs when the first information matches the second information; and selects one remote UE from among the remote UEs according to a priority when the first information does not match the second information, the first information may include access class information on the remote UE, access control mechanism information on the remote UE, and configuration information on the remote UE, and the second information may include access class information on the relay UE, access control mechanism information on the relay UE, and configuration information on the relay UE.

According to one aspect of the present invention, there is a provided a criterion for a relay UE to select one of remote UEs when access control is applied, thereby preventing unnecessary waste of resources, battery consumption, and a delay in service connection.

BRIEF DESCRIPTION OF THE DRAWINGS

FIG. 12b illustrates a method for a relay UE to select a remote UE to which the relay UE transmits a response message in discovery model B.

DESCRIPTION OF EXEMPLARY EMBODIMENTS

Figure 1:
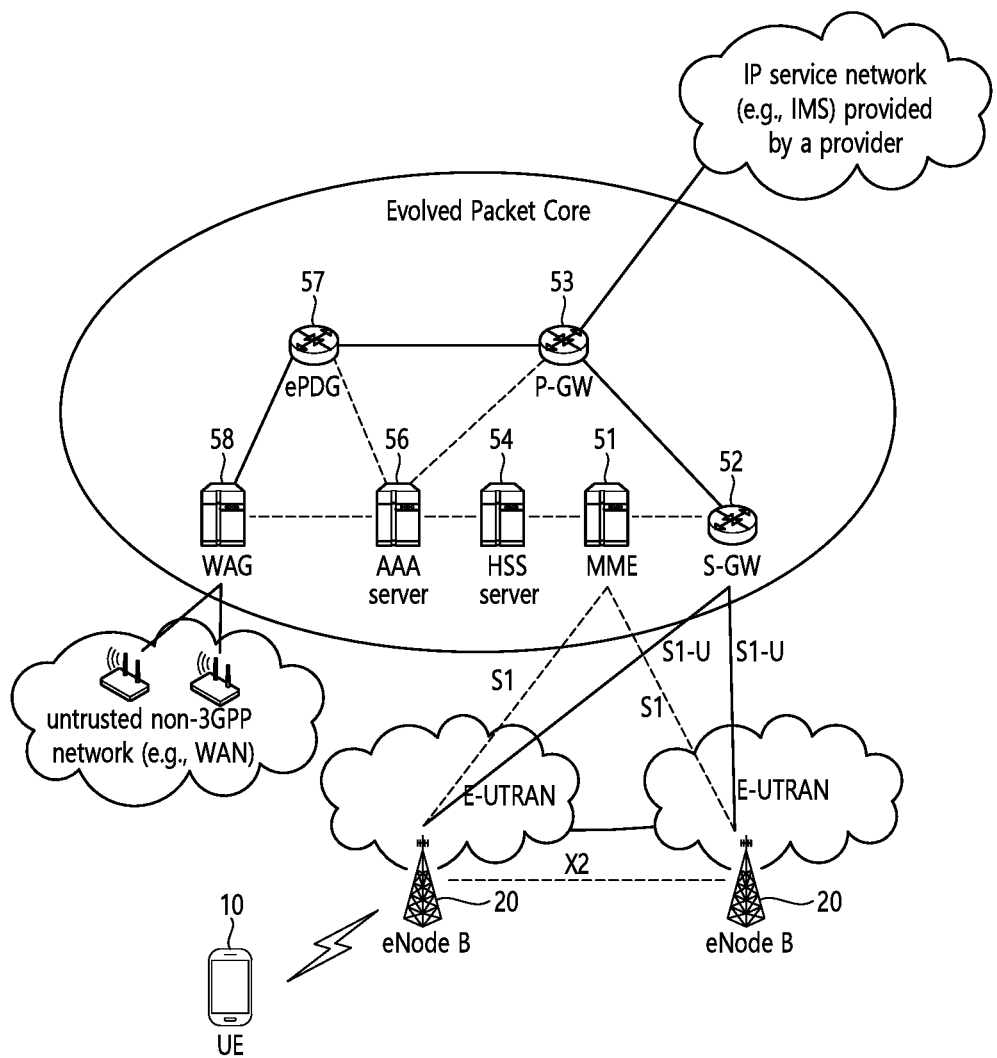
FIG. 1 illustrates the configuration of an evolved mobile communication network.
Figure 2:
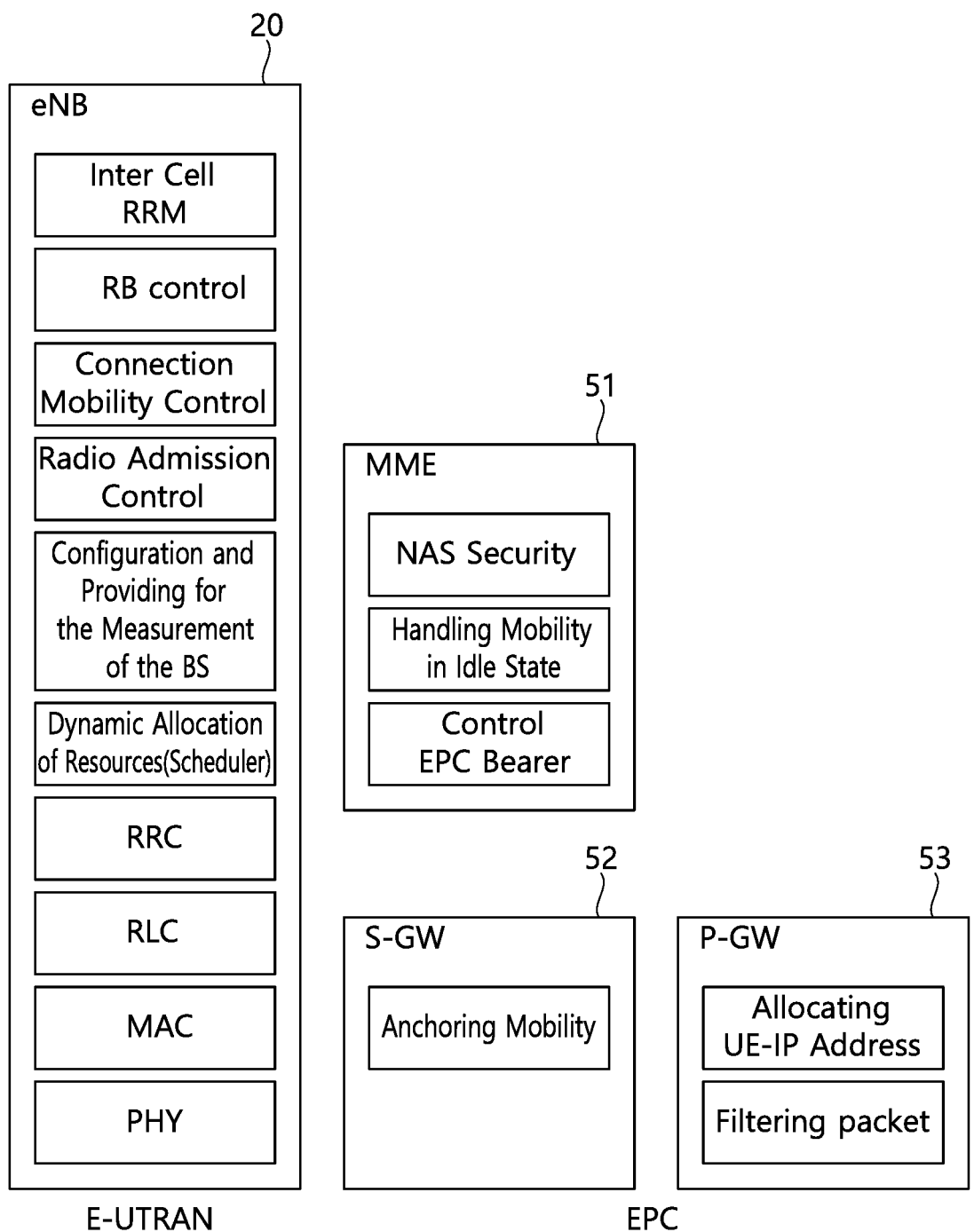
FIG. 2 is an exemplary diagram illustrating the architecture of a common E-UTRAN and a common EPC.
Figure 3:
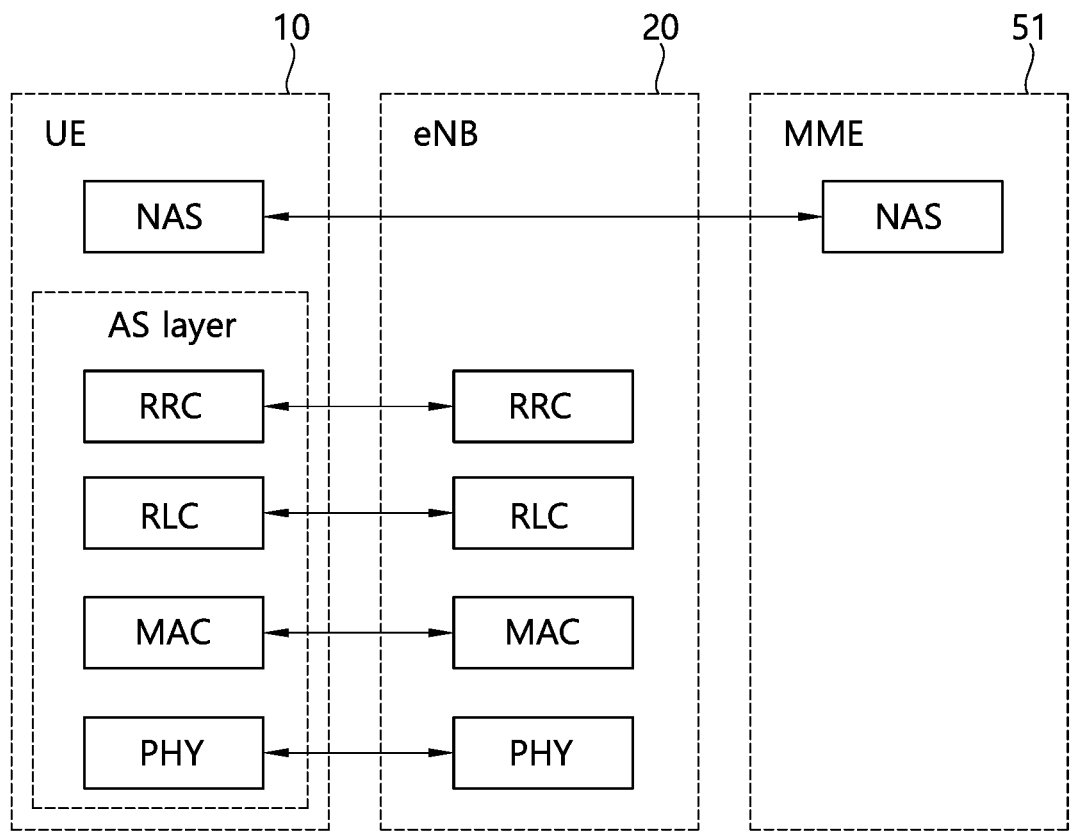
FIG. 3 is an exemplary diagram illustrating the structure of a radio interface protocol in a control plane between a UE and an eNodeB.
Figure 4:
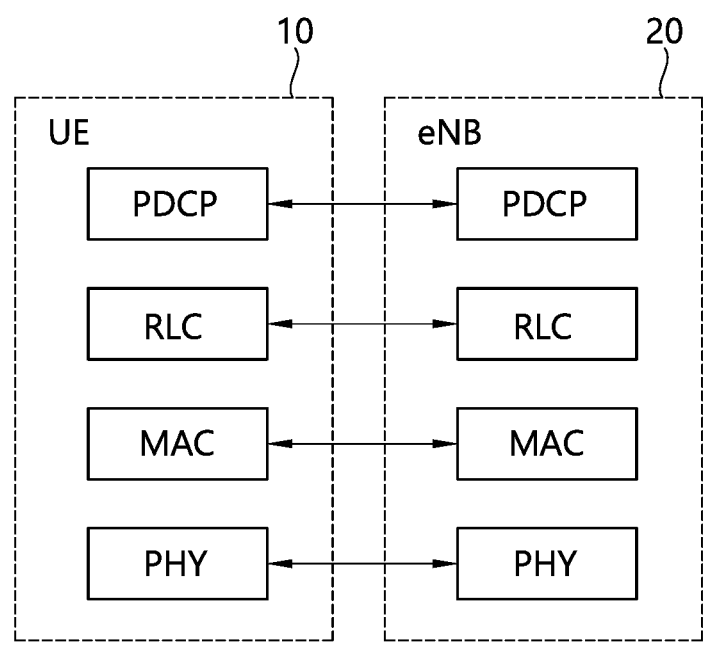
FIG. 4 is another exemplary diagram illustrating the structure of a radio interface protocol in a control plane between a UE and an eNodeB.
Figure 5A:
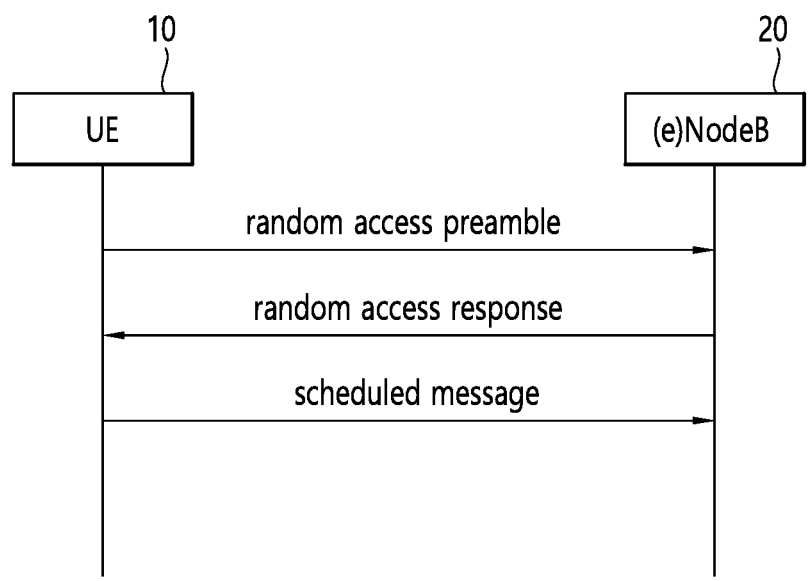
FIG. 5a is a flowchart illustrating a random access process in 3GPP LTE.
Figure 5B:
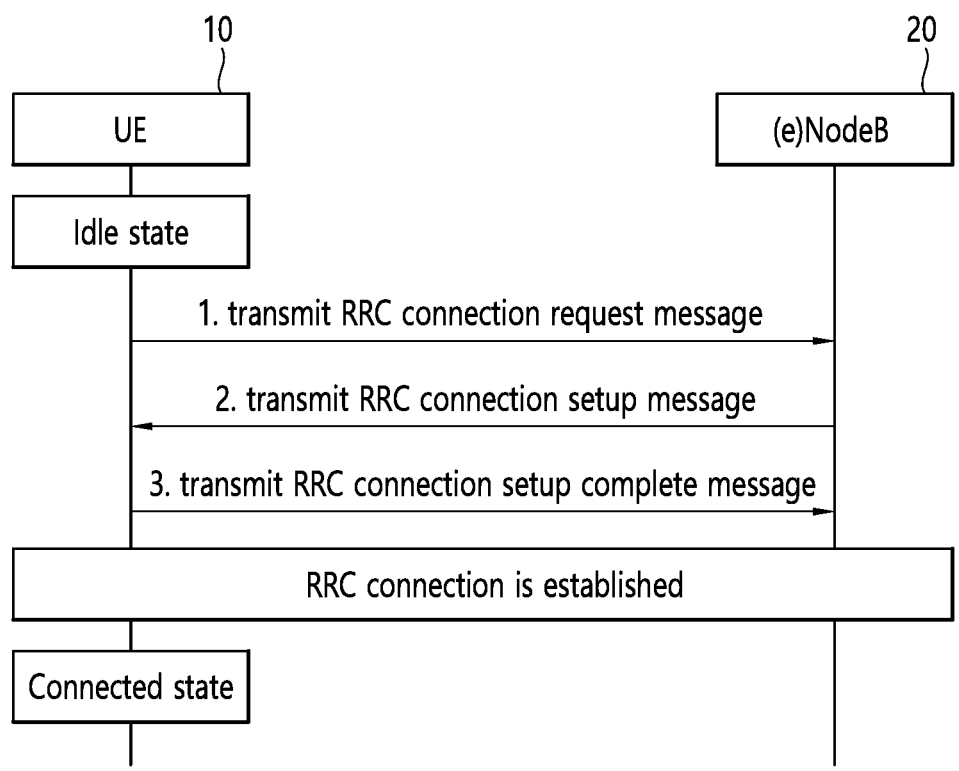
FIG. 5b illustrates a connection process in an RRC layer.

The present invention is described in light of UMTS (Universal Mobile Telecommunication System) and EPC (Evolved Packet Core), but not limited to such communication systems, and may be rather applicable to all communication systems and methods to which the technical spirit of the present invention may apply.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the invention includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the invention, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

In the drawings, user equipments (UEs) are shown for example. The UE may also be denoted a terminal or mobile equipment (ME). The UE may be a laptop computer, a mobile phone, a PDA, a smartphone, a multimedia device, or other portable device, or may be a stationary device such as a PC or a car mounted device.

Definition of Terms

For a better understanding, the terms used herein are briefly defined before going to the detailed description of the invention with reference to the accompanying drawings.

UMTS: Stands for Universal Mobile Telecommunication System and means a 3rd generation mobile communication network.

UE/MS: User Equipment/Mobile Station. Means a terminal device.

EPC: Stands for Evolved Packet Core and means a core network supportive of a long term evolution (LTE) network. An evolved version of UMTS.

Public Data Network (PDN): An independent network in which a service providing server is located.

PDN Connection: A connection from UE to PDN, i.e., association (connection) between a UE represented with an IP address and a PDN represented with an APN (access point name).

Packet Data Network Gateway (PDN-GW): A network node of an EPS network performing functions such as UE IP address allocation, packet screening & filtering, and charging data collection.

Serving GW (Serving Gateway): A network node of an EPS network performing functions such as mobility anchor, packet routing, idle mode packet buffering, and triggering MME to page UE.

Policy and Charging Rule Function: A node of an EPS network performing a policy decision for dynamically applying QoS and a billing policy that are different for each service flow.

Access Point Name (APN): The name of an access point managed by a network, provided from a UE, i.e., a character string for denoting a PDN or distinguishing a PDN from another. Accessing a requested service or network (PDN) gets through a corresponding P-GW, and an APN is a name (e.g., internet.mnc012.mcc345.gprs) pre-defined in the network to be able to discover the P-GW.

Tunnel Endpoint Identifier (TEID): The end point ID of a tunnel set between nodes within a network, which is set by an interval for a bearer for each UE.

NodeB: A UMTS network base station. A NodeB is installed outdoors and corresponds in cell coverage size to a macro cell.

eNodeB: An Evolved Packet System (EPS) base station and is installed outdoors. An eNodeB corresponds in cell coverage size to a macro cell.

(e)NodeB: Collectively denotes NodeB and eNodeB.

MME: Stands for Mobility Management Entity and plays a role to control each entity in an EPS to provide mobility and session for a UE.

Session: A pathway for data transmission. The unit of session may include PDN, bearer, and IP flow which respectively correspond the unit of the overall target network (unit of APN or PDN), the unit distinguished by QoS therein (unit of bearer), and unit of destination IP address.

PDN Connection: A connection from a UE to a PDN, i.e., an association (connection) between a UE represented with an IP address and a PDN represented with an APN. This means a connection (UE-PDN GW) between entities in a core network to form a session.

UE Context: Information on UE's context used to manage UE in network, i.e., context information consisting of UE id, mobility (e.g., current location), and session attribute (QoS, or priority).

Open Mobile Alliance Device Management (OMA DM): A protocol designed for managing mobile devices, such as mobile phones, PDAs, or portable computers, which performs functions of device configuration, firmware upgrading, and error reporting Operation Administration and Maintenance (OAM): Denotes a group of network management functions of displaying network faults and providing capability information, data, and diagnosis.

NAS configuration Management Object (MO): Denotes an MO used to configure, in UE, parameters associated with NAS functionality.

NAS (Non-Access-Stratum): Upper stratum of a control plane between a UE and an MME. Supports mobility management, session management, IP address management, etc. between a UE and a network.

Mobility Management (MM) operation/procedure: An operation or procedure for regulating/managing/controlling the mobility of a UE. The MM operation/procedure may be interpreted as including one or more of an MM operation/procedure in a CS network, a GMM operation/procedure in a GPRS network, and an EMM operation/procedure in an EPS network. A UE and a network node (e.g., an MME, an SGSN, and an MSC) exchange MM messages to perform the MM operation/procedure.

Session Management (SM) operation/procedure: An operation or procedure for regulating/managing/processing/handling a user plane and/or a bearer context/PDP context of a UE. The SM operation/procedure may be interpreted as including one or more of an SM operation/procedure in a GPRS network and an ESM operation/procedure in an EPS network. A UE and a network node (e.g., an MME and an SGSN) exchange SM messages to perform the SM operation/procedure.

Low-priority UE: A UE configured with low priority in NAS signaling.

Normal-priority UE: A normal UE not configured with low priority

Dual-priority UE: A UE configured with dual priority. That is, a UE that is configured with low priority in NAS signaling and is also configured to override the low priority in NAS signaling.

Public Land Mobile Network (PLMN): The abbreviation for Public Land Mobile Network, which means the network identification number of a mobile communication provider. In roaming of a UE, the PLMN is divided into a home PLMN (HPLMN) and a visited PLMN (VPLMN).

Proximity Service (ProSe Service or Proximity-based Service): Means discovery and mutually direct communication between physically adjacent UEs. However, the proximity service is a concept including communication between UEs through a base station and, furthermore, a concept including communication between UEs through a third UE. Here, data on a user plane is exchanged through a direct data path without passing through a 3GPP core network (e.g. EPC).

Proximity: That a UE is located in close proximity to another UE means when a predetermined proximity condition is met. A proximity condition for discovery may be different from a proximity condition for communication.

Range Class: Means a rough distance range as a use for ProSe discovery, for example, a geographical distance range, and a distance range as a communication condition.

ProSe-enabled UE: Means a UE supporting ProSe discovery, ProSe communication and/or ProSe-supported WLAN direct communication. In the present invention, the ProSe-enabled UE is also referred to as UE simply.

Announcing UE: A UE that notifies of information that can be used by adjacent UEs having discovery rights.

Monitoring UE: A UE that receives interested information from other adjacent UEs.

ProSe-enabled Network: Means a network supporting ProSe discovery, ProSe communication and/or ProSe-supported WLAN direct communication. In the present invention, the ProSe-enabled Network is also referred to as network simply.

ProSe Discovery: Refers to a process of discovering a ProSe-enabled UE when it is closely located.

Open ProSe Discovery: Means that it is possible to discover a ProSe-enabled UE without a direct permission when detecting it.

Restricted ProSe Discovery: Means that it is possible to discover a ProSe-enabled UE only with a direct permission when detecting it.

ProSe Communication: Means performing communication between UEs using an E-UTRAN communication path when a ProSe-enabled UE is closely located. A communication path may be established, for example, directly between UEs or via a local (or neighbor) eNodeB.

ProSe Group Communication: Means performing one-to-all group communication using a common communication path established between two or more ProSe-enabled UEs when they are located adjacent to each other.

ProSe E-UTRA communication: Means ProSe communication using an E-UTRA communication path.

ProSe-assisted WLAN Direct Communication: Means ProSe communication using a WLAN direct communication path.

ProSe Communication Path: Means a communication path supporting ProSe communication. A path of the ProSe E-UTRA communication can be established directly between ProSe-enabled UEs by using an E-UTRA or an eNodeB. A path of the ProSe-assisted WLAN direct communication can be established directly between the ProSe-enabled UEs via a WLAN.

EPC Path (or Infrastructure Data Path): Means a communication path of a user plane via EPC.

ProSe Relay: May have two types as a UE capable of operating as a relay for ProSe.

ProSe UE-to-Network Relay: Means playing a role of a communication repeater between a ProSe-enabled Network and a ProSe-enabled UE.

ProSe UE-to-UE Relay: Means playing a role of a communication repeater between ProSe-enabled UEs.

<Introduction of Proximity Services>

Figure 8:
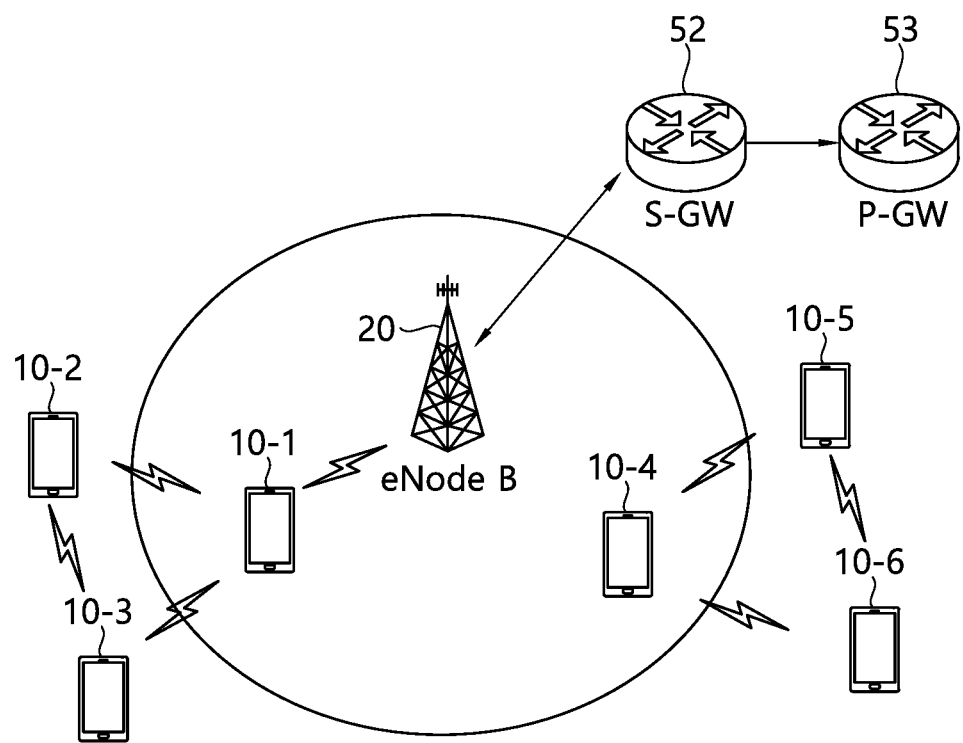
FIG. 8 illustrates the concept of proximity communication expected to be employed in a next-generation communication system.

FIG. 8 illustrates the concept of proximity communication expected to be employed in a next-generation communication system.

An increase in a user requirement for a social networking service (SNS) results in the arising of a demand for a discovery between physically adjacent UEs and special applications/services, i.e., proximity-based application/services. Therefore, there is a growing increase in a demand for proximity communication between UEs.

Figure 6:
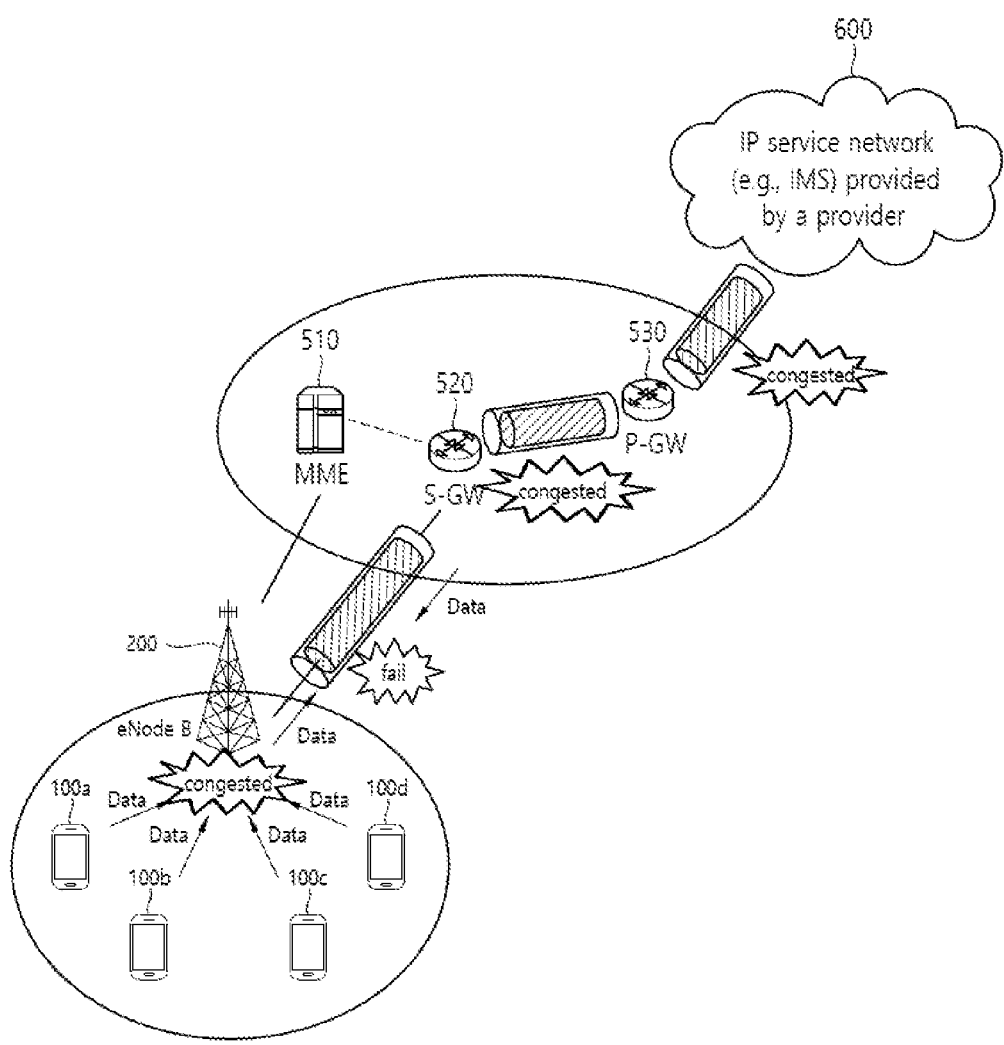
FIG. 6 illustrates a network overload situation.
Figure 7:
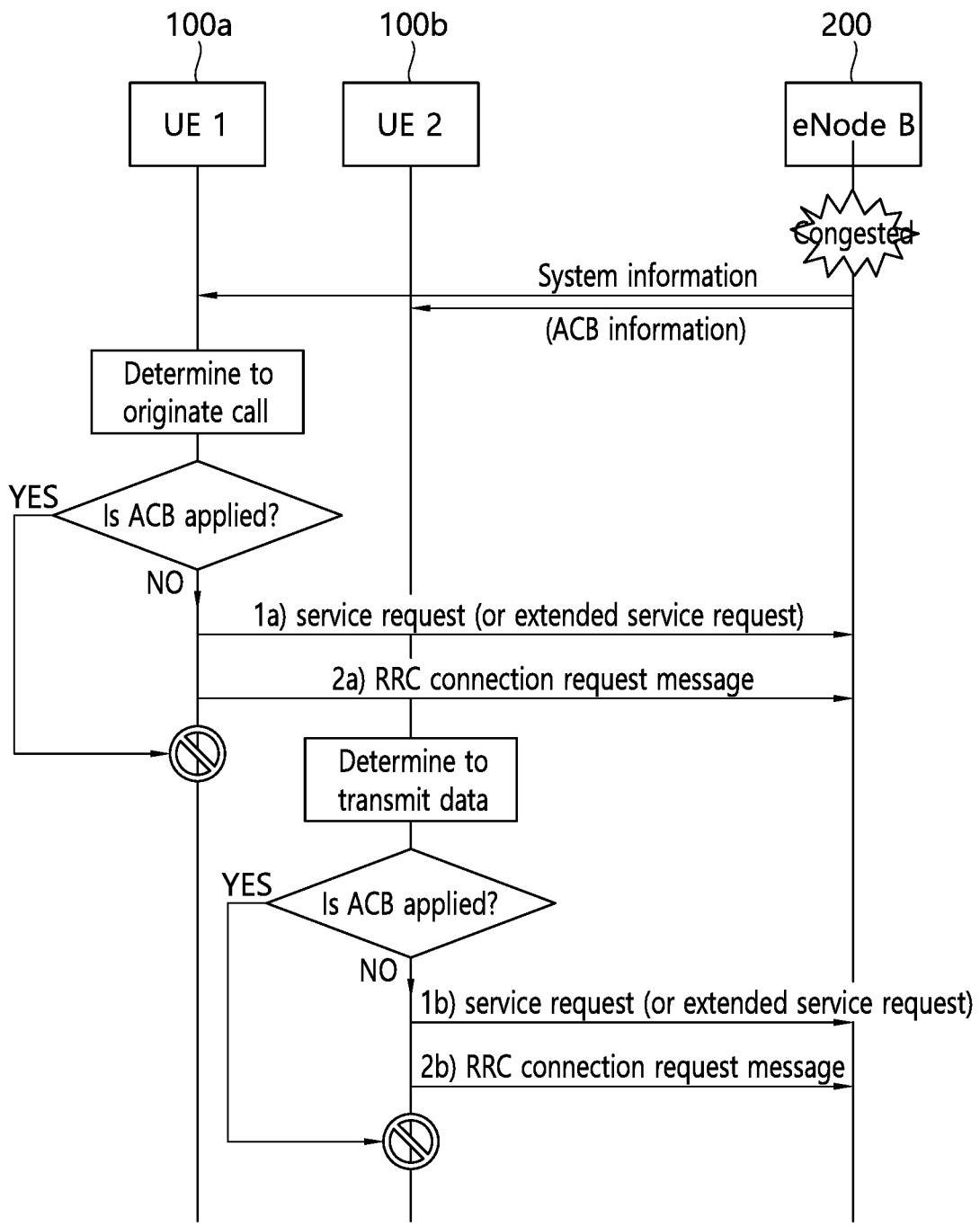
FIG. 7 is an exemplary flowchart illustrating an access barring operation in a network congestion state.

In order to apply the aforementioned requirement, as illustrated in FIG. 6b, there is an ongoing discussion on a method capable of performing a directly communication among a UE#1 10-1, a UE#2 10-2, and a UE#3 10-3 or among a UE#4 10-4, a UE#5 10-5, and a UE#6 10-6 without an intervention of an eNodeB 20. Of course, communication may be achieved directly between the UE#1 10-1 and the UE#4 10-4 with the assistance of the eNodeB 20. Meanwhile, the UE#1 10-1 may play a role of a relay for the UE#2 10-2 and the UE#3 10-3 located far from a cell center. Likewise, the UE#4 10-4 may play a role of a relay for the UE#5 10-5 and the UE#6 10-6 located far from the cell center.

Meanwhile, the UE#1 10-1 may transmit a discovery signal to discover other UEs, for example, the UE#5 10-5 and the UE#6 10-6. Alternatively, in order to be discovered by other UEs, for example, the UE#5 10-5 and the UE#6 10-6), the UE#1 10-1 may transmit the discovery signal.

Figure 9A:
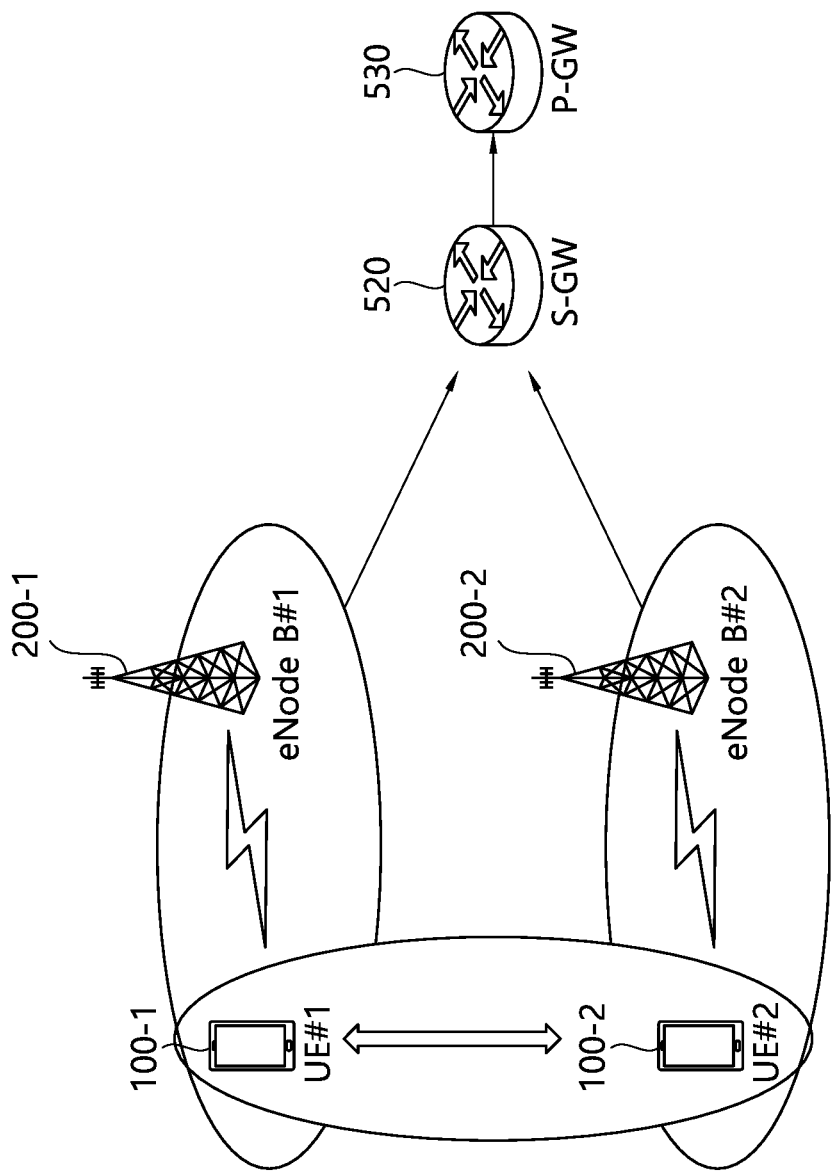
FIG. 9a is an exemplary diagram illustrating an example of proximity communication.
Figure 9B:
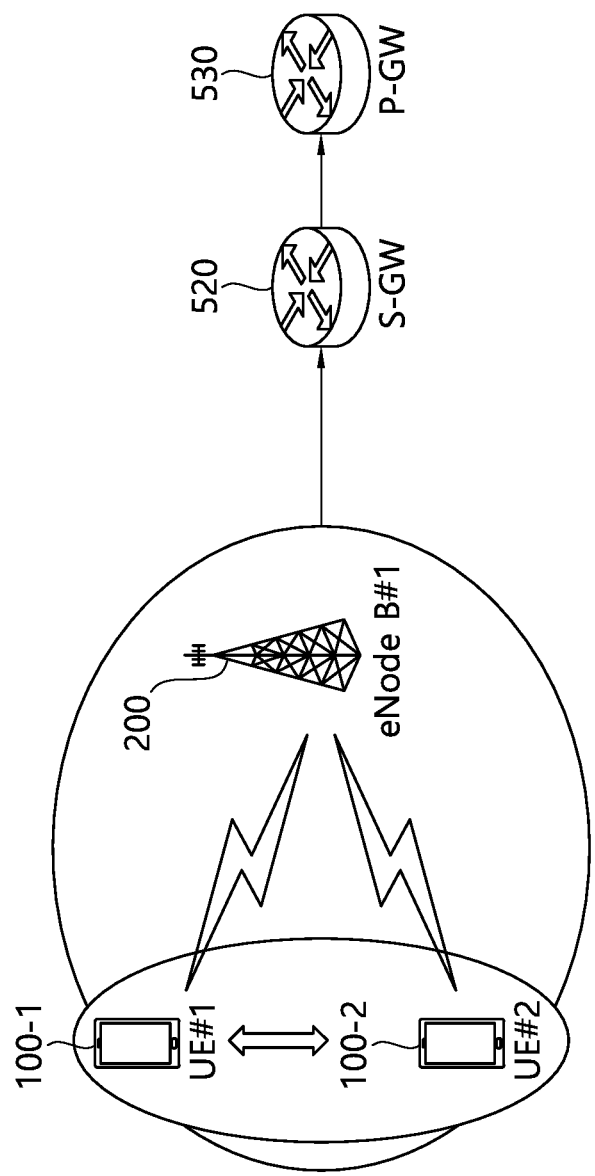
FIG. 9b is an exemplary diagram illustrating another example of proximity communication.

FIG. 9a is an exemplary diagram illustrating an example of proximity communication, and FIG. 9b is an exemplary diagram illustrating another example of proximity communication.

Referring to FIG. 9a, there is illustrated a situation that a UE#1 100-1 and a UE#2 100-2 perform proximity communication through a direct communication path while camping on different eNodeBs, respectively. Referring to FIG. 9b, there is shown a situation that a UE#1 100-1 and a UE#2 100-2 perform proximity communication through a direct communication path while camping on an eNodeB 200, respectively.

As such, the UE#1 100-1 and the UE#2 100-2 may perform proximity communication through a direct communication path bypassing a path through an eNodeB and a core network that a service provider operates.

The term "direct communication path" may be variously referred to as data path for proximity service, data path based on proximity service or proximity service communication path. Furthermore, communication through the direct communication path may be variously called direct communication, proximity service communication or proximity service-based communication.

An example of a proximity service may be a safety-related service. For example, when the user of a UE is in an emergency but is located outside the coverage of a BS, the user may transmit a distress signal for indicating that the user is in an emergency to a different UE via the proximity service. Alternatively, when the user of the UE is dispatched for an emergency rescue but is located outside the coverage of the BS, the user may transmit a distress signal to a different UE via the proximity service in order to report the emergency to other rescue workers or to ask for help.

Another example of a proximity service may be a social networking service (SNS). Since the SNS causes very frequent data transmission, the load of a BS can be increased. Therefore, when the proximity service is performed directly between UEs without intervention of a BS, it is possible to reduce the load of the BS.

Still another example of a proximity service may be a group communication service. An example of the group communication service is a push-to-talk (PTT) service. Describing the PTT service as an example, in group communication, one UE as a talking party may transmit media (e.g., voice), and a plurality of different UEs may receive the media from the talking party UE. Here, it is impossible that the UEs simultaneously transmit media as talking parties.

<Problems that Occur when Access Control is Performed in a Proximity Service>

As described above, a remote UE can receive a network connection service through a relay UE. However, when access control is applied due to network congestion, the remote UE may not establish an RRC connection or may not use a particular service and/or application, which is described in detail with reference to FIG. 10.

Figure 10:
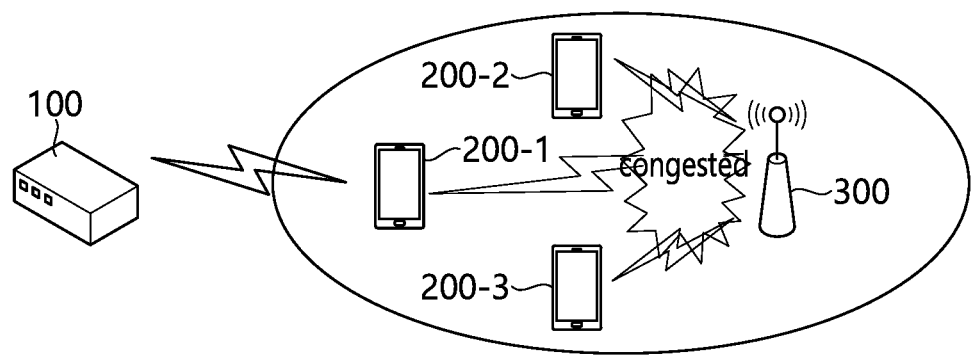
FIG. 10 is an exemplary diagram illustrating a problem that may occur when access control is performed in a proximity service.

FIG. 10 is an exemplary diagram illustrating a problem that may occur when access control is performed in a proximity service.

Referring to FIG. 10, a remote UE 100 may request a network connection service through a relay UE 200-1 to connect to a BS 300. Here, when a plurality of relay UEs 200-1, 200-2, and 200-3 is connected to the particular BS 300 and thus network congestion occurs, access control may be applied, in which case the remote UE 100 may not properly access the BS 300.

That is, the remote UE 100 may not establish an RRC connection for being allocated resources or may not use a particular service and/or application that the remote UE 100 desires to use.

As illustrated in FIG. 10, when network congestion occurs, the remote UE 100 may request a network connection service from the relay UE 200-1 even without recognizing the situation of network congestion, thereby unnecessarily wasting resources, consuming the battery, and causing a delay in service connection.

Further, an agent performing access control in the case of network congestion is not clarified in the current 3GPP specifications. That is, it is not clarified whether access control is performed by the remote UE 100 or the relay UE 200-1 when network congestion occurs as in FIG. 10.

<Description of Present Invention>

Accordingly, the present invention proposes a method for a remote UE (evolved ProSe remote UE) to efficiently perform access control when data is transmitted in a 3GPP relay network (evolved ProSe UE-to-network relay).

I. Suggestion 1: Discovery Model A

Figure 11:
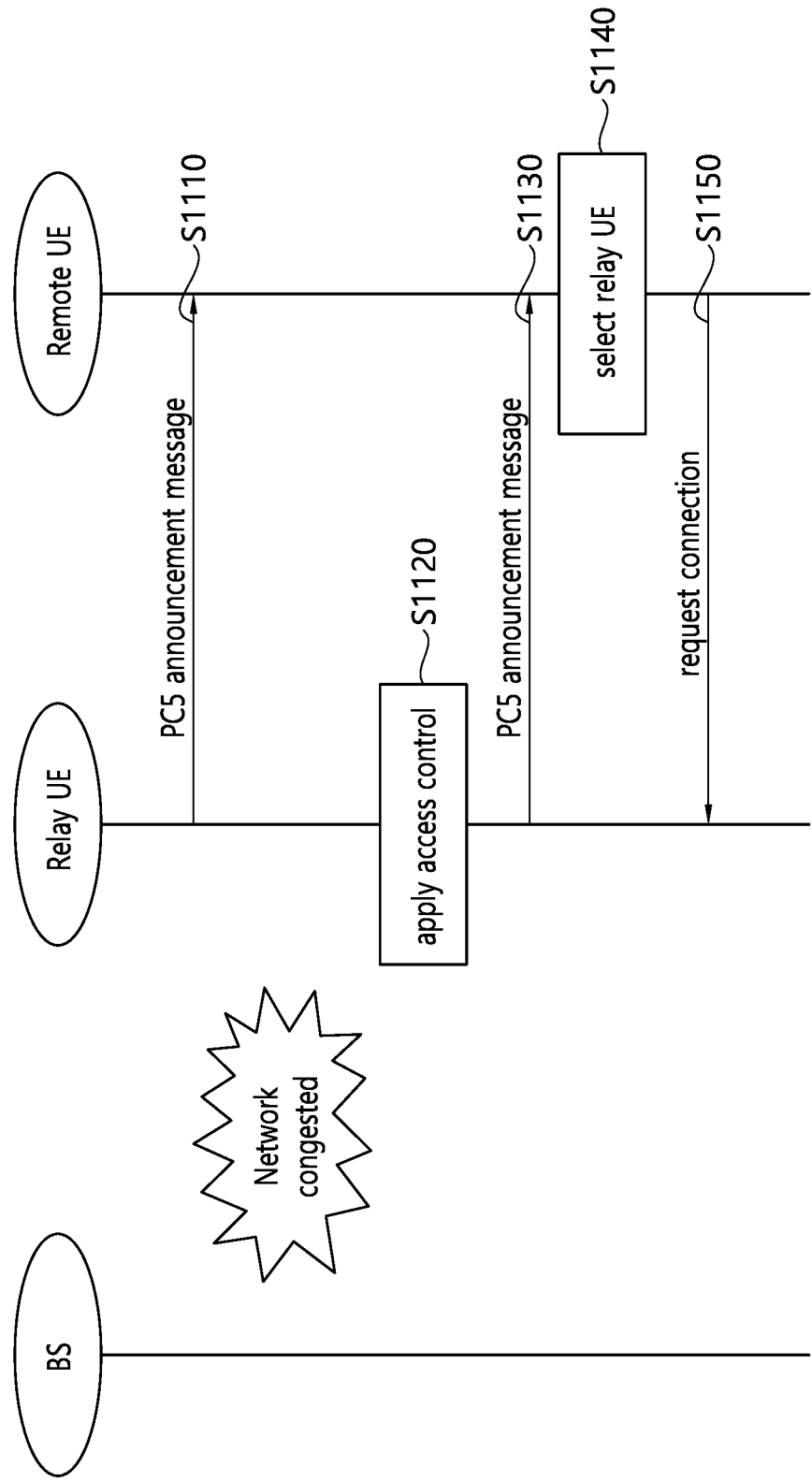
FIG. 11 illustrates a method for a remote UE to select a relay UE to which the remote UE attempts to connect in discovery model A.

FIG. 11 illustrates a method for a remote UE to select a relay UE to which the remote UE attempts to connect in discovery model A.

Referring to FIG. 11, in discovery model A, the relay UE may periodically transmit a message (e.g., a PC5 announcement message) indicating that the relay UE is a relay UE (S1110). When access control is applied due to network congestion (S1120), the relay UE may transmit a message including access control information to the remote UE (S1130). Depending on the embodiment, the access control information may be a PC5 announcement message or a new message. Depending on the embodiment, the relay UE may use any one of PC5-Signaling, PC5-Discovery, PC5-U, and PPC connection establishment to transmit the access control information.

Different content may be included in the access control information depending on the embodiment. That is, the access control information may include different content depending on the agent performing access control. Hereinafter, content included in the access control information depending on the agent performing access control is described.

(1) When Access Control is Performed by the Remote UE

1) Access class information on the relay UE

2) Access control mechanism-related parameter information (e.g., ACB, SSAC, ACB skip, EAB, and ACDC) provided by a current serving cell via SIB2, SIB14, or a new SIB Here, the access control mechanism-related parameter information includes ACB barring parameters (e.g., barring rate and barring time), SSAC barring parameters for MMTEL voice and/or MMTEL video, ACB skip parameters for MMTEL voice and/or MMTEL video, SMS over IP and SMS (over NAS), ACDC parameters (e.g., barring rate and barring time for an ACDC category), and barring parameters for CSFB, an emergency and high priority.

3) Access control mechanism information (EAB, overriding EAB, and ACDC) set in the relay UE 4) Configuration information (e.g., NAS signaling low priority and overriding NAS signaling low priority (=dual priority)) set in the relay UE 5) Information on the start of access control and/or information on the termination of access control Here, the information on the start of access control may be information (or an indicator) explicitly indicating the start of access control. Also, without the information explicitly indicating the start, when the remote UE receives the information (1) to (4) from the relay UE, access control may be considered to be started. Further, the information on the termination of access control may be information (or an indicator) explicitly indicating the termination of access control. Also, without the information explicitly indicating the termination, when the remote UE does not receive the information (1) to (4) from the relay UE, access control may be considered to be terminated.

6) Information on whether the relay UE is in the connected mode or the idle mode (i.e., information indicating whether the current relay mode is the connected mode or the idle mode or indicating whether a switch to the connected mode is started)

When the remote UE fails to receive information relating to the connected mode from the relay UE, the relay UE may be considered to be in the idle mode. On the contrary, when the remote UE fails to receive information relating to the idle mode from the relay UE, the relay UE may be considered to be in the connected mode.

7) Relay service code of the relay UE

The relay service code may be preset information from the network.

8) User information identifier (User Info ID) of the relay UE

The user information identifier may be preset information from the network.

(2) When Access Control is Performed by the Relay UE

1) Access class information on the relay UE

2) Access control mechanism information (EAB, overriding EAB, and ACDC) set in the relay UE 3) Configuration information (e.g., NAS signaling low priority and overriding NAS signaling low priority (=dual priority)) set in the relay UE 4) Information on the start of access control and/or information on the termination of access control Here, the information on the start of access control may be information (or an indicator) explicitly indicating the start of access control. Also, without the information explicitly indicating the start, when the remote UE receives the information (1) to (4) from the relay UE, access control may be considered to be started. Further, the information on the termination of access control may be information (or an indicator) explicitly indicating the termination of access control. Also, without the information explicitly indicating the termination, when the remote UE does not receive the information (1) to (4) from the relay UE, access control may be considered to be terminated.

5) Information on whether the relay UE is in the connected mode or the idle mode (i.e., information indicating whether the current relay mode is the connected mode or the idle mode or indicating whether a switch to the connected mode is started)

When the remote UE fails to receive information relating to the connected mode from the relay UE, the relay UE may be considered to be in the idle mode. On the contrary, when the remote UE fails to receive information relating to the idle mode from the relay UE, the relay UE may be considered to be in the connected mode.

6) Relay service code of the relay UE: The relay service code may be preset information from the network.

7) User information identifier (User Info ID) of the relay UE: The user information identifier may be preset information from the network.

When access control is performed by the relay UE, the relay UE may receive access control mechanism-related parameter information from the serving network via an SIB (or dedicated channel). Depending on the embodiments, the relay UE may receive the access control mechanism-related parameter information periodically or on demand. The access control mechanism-related parameter information may include access control mechanism-related parameter information (e.g., ACB, SSAC, ACB skip, EAB, and ACDC) provided by a current serving cell via SIB2, SIB14, or a new SIB. The access control mechanism-related parameter information includes ACB barring parameters (e.g., barring rate and barring time), SSAC barring parameters for MMTEL voice and/or MMTEL video, ACB skip parameters for MMTEL voice and/or MMTEL video, SMS over IP and SMS (over NAS), ACDC parameters (e.g., barring rate and barring time for an ACDC category), and barring parameters for CSFB, an emergency and high priority.

The access control information may be provided to a plurality of UEs, may be provided only to a particular UE, or may be broadcast to all UEs through a dedicated channel. The access control information may be provided periodically or on demand (that is, the remote UE provides the access control information when the access control information is requested).

According to embodiments, when the remote UE detects a relay UE that starts access control, the remote UE does not attempt to connect to the relay UE that starts access control but may attempt to connect to another UE that does not start access control.

The remote UE may obtain the access class information, the access control mechanism-related parameter information, the configuration information set in the relay UE, and the like from the relay UE via 1) to 4).

According to an embodiment, the information received by the remote UE from the relay UE via 1) to 4) may not correspond to information that the remote UE has. For example, the remote UE has an access class of "7", while and the obtained access class of the relay UE may be "3". Also, the remote UE is configured for EAB and/or ACDC, while the received access control information may indicate "not be configured for EAB and/or ACDC". In addition, the remote UE may be configured for NAS signaling low priority and/or overriding NAS signaling low priority, while the received access control information may indicate "not be configured for NAS signaling low priority and/or overriding NAS signaling low priority".

When the access control information does not match the information that the remote UE has, the remote UE may select a relay UE to which the remote UE attempts to connect through the following operation (S1140). The remote UE may attempt to connect to the selected relay UE in order to access the network through the selected relay UE (S1150).

(1) When the information that the remote UE has partially matches the access control information received from the relay UE, the remote UE may select a relay UE based on the priorities. For example, according to an embodiment, the priorities may be as follows.

1) First, the remote UE may select a relay UE that has transmitted the same access class as that of the remote UE and may attempt to connect to the selected relay UE.

2) Second, when step 1) failed, the remote UE may select a relay UE that has transmitted the same configuration information (particularly, NAS signaling low priority and overriding NAS signaling low priority) as that of the remote UE and may attempt to connect to the selected relay UE.

3) Third, when steps 1) and 2) failed, the remote UE may select a relay UE that has transmitted the same EAB-related information (particularly, EAB and overriding EAB) as that of the remote UE among access control mechanism information on the remote UE and may attempt to connect to the selected relay UE.

4) Fourth, when steps 1) to 3) failed, the remote UE may select a relay UE that has transmitted the same ACDC-related information as that of the remote UE among the access control mechanism information on the remote UE and may attempt to connect to the selected relay UE.

(2) The priorities may be determined based on separate configuration information provided by the network (BS, MME/SGSN, or carrier network). The priorities may be transmitted via an OMA-DM, a USIM, an SIB, or a dedicated channel.

(3) When there is no relay UE that has transmitted the same access class information, currently set access control mechanism information, and currently set configuration information as those of the remote UE in the discovery process for detecting a relay UE to which the remote UE connects, the remote UE may select one of relay UEs that have transmitted different information, instead of such pieces of information, and may attempt to connect to the selected relay UE.

(4) Among the foregoing relay UE selection methods (1) to (3), a method for selecting a relay UE may be determined based on separate configuration information provided by the network (BS, MME/SGSN, or carrier network). The network may transmit determined separate configuration information to the remote UE through an OMA-DM, a USIM, an SIB, or a dedicated channel. The determined separate configuration information may be one of the relay UE selection methods (1) to (3) or may be a combination of two or more of the relay UE selection methods.

When there is no relay UE that has transmitted the same access class information, currently set access control mechanism information, and currently set configuration information as those of the remote UE, the remote UE may select a relay UE to connect to based on a direct discovery operation for public safety.

The direct discovery for public safety is described in sections 4.5.1.1.2.3.2 and 4.5.1.1.2.3.4 "Direct Discovery for Public Safety" of 3GPP TS 23.303 (2017-06). Additional information not directly used in the discovery may be disclosed via a single or individual announcement message in a "Relay Discovery Additional Information" type using a PC-5D protocol stack, such as a relayed TMGI and the ECGI of the serving cell.

That is, the remote UE may attempt to detect a relay UE that provides a relay service code and user information identifier information, which match a preconfigured relay service code and preconfigured user information identifier (User Info ID) information of the remote UE, and may attempt to connect to the detected relay UE. Depending on the embodiment, this connection attempt may be performed before the relay UE selection methods (1) to (3) or after the relay UE selection methods (1) to (3).

According to an embodiment, the connection attempt may be performed independently of the relay UE selection methods (1) to (3). That is, according to an embodiment, independently of whether the relay UE selection methods (1) to (3) are performed, the remote UE may attempt to detect a relay UE that provides a relay service code and user information identifier information, which match the preconfigured relay service code and the preconfigured user information identifier information of the remote UE, and may attempt to connect to the detected relay UE.

According to an embodiment, when there is a plurality of relay UEs to which the remote UE attempts to connect while performing the relay UE selection methods (1) to (4), the remote UE may select a relay UE having a high signal strength or may select a relay UE based on a configuration/policy from the network (e.g., BS, MME/SGSN, or carrier network) and may attempt to connect to the selected relay UE.

II. Suggestion 2: Discovery Model B

Figure 12A:
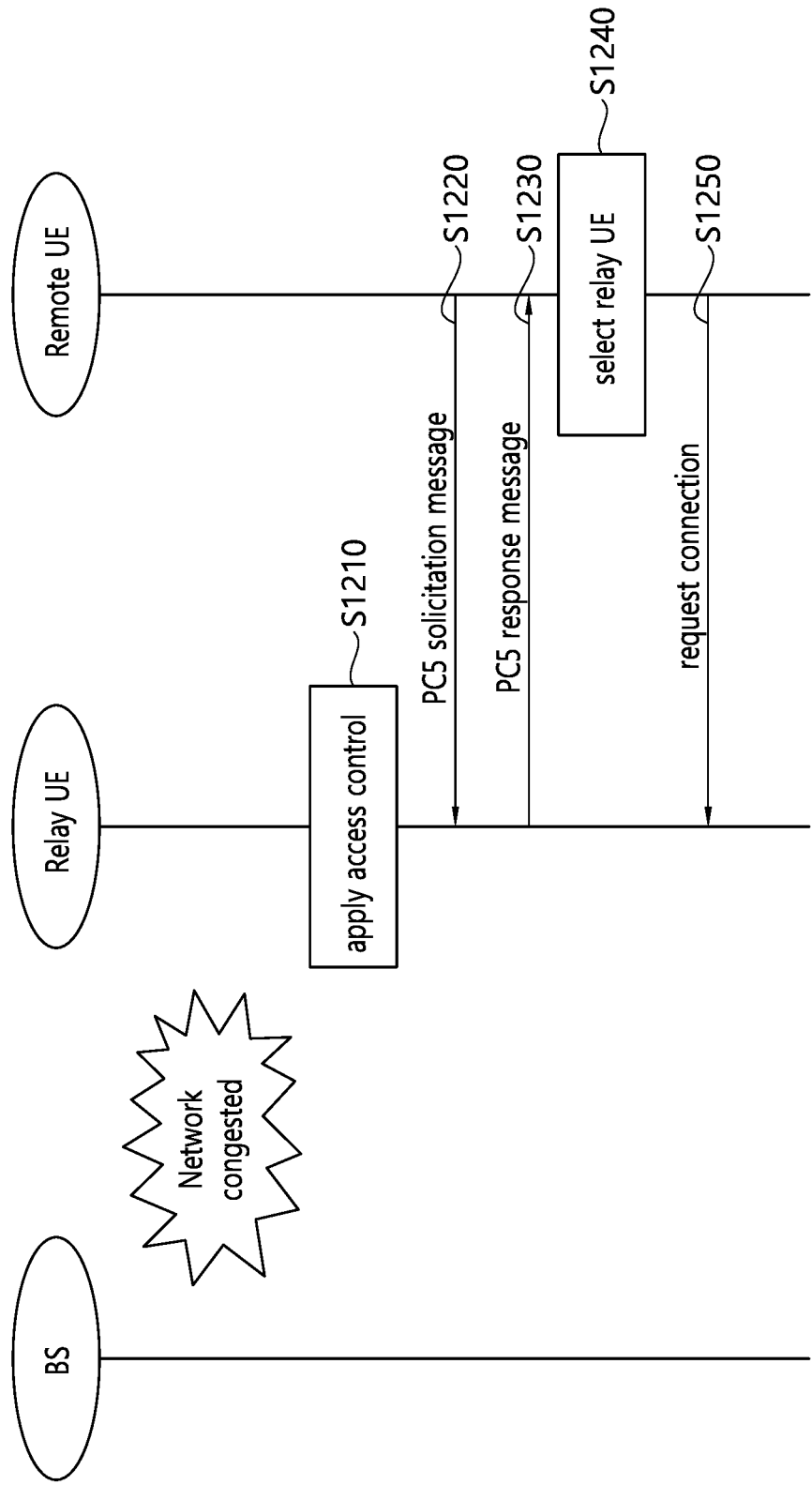
FIG. 12a illustrates a method for a remote UE to select a relay UE to which the remote UE attempts to connect in discovery model B.

FIG. 12a illustrates a method for a remote UE to select a relay UE to which the remote UE attempts to connect in discovery model B.

Referring to FIG. 12a, in discovery model B, the remote UE may transmit an announcement message to detect a relay UE. The announcement message may be a PC5 solicitation message.

When a relay UE receives the announcement message from the remote UE, which is trying to discover a relay UE in order to receive a network connection service, while applying access control (S1210), the remote UE may perform one of the following relay UE selection methods.

That is, when the relay UE receives the announcement message (e.g., a PC5 solicitation message) from the remote UE, which is trying to discover a relay UE in order to receive a network connection service, (S1220) while applying access control in network congestion, the relay UE may transmit a discovery response message to the remote UE in response to the announcement message (S1230). The discovery response message may be a PC5 response message or a new response message. Depending on the embodiment, the relay UE may use any one of PC5-Signaling, PC5-Discovery, PC5-U, and PPC connection establishment to transmit the discovery response message.

The discovery response message may include at least one of the following pieces of information.

1) Access class information on the relay UE

2) Access control mechanism-related parameter information (e.g., ACB, SSAC, ACB skip, EAB, and ACDC) provided by a current serving cell via SIB2, SIB14, or a new SIB Here, the access control mechanism-related parameter information includes ACB barring parameters (e.g., barring rate and barring time), SSAC barring parameters for MMTEL voice and/or MMTEL video, ACB skip parameters for MMTEL voice and/or MMTEL video, SMS over IP and SMS (over NAS), ACDC parameters (e.g., barring rate and barring time for an ACDC category), and barring parameters for CSFB, an emergency and high priority.

3) Access control mechanism information (EAB, overriding EAB, and ACDC) set in the relay UE 4) Configuration information (e.g., NAS signaling low priority and overriding NAS signaling low priority (=dual priority)) set in the relay UE 5) Information on the start of access control and/or information on the termination of access control Here, the information on the start of access control may be information (or an indicator) explicitly indicating the start of access control. Also, without the information explicitly indicating the start, when the remote UE receives the information (1) to (4) from the relay UE, access control may be considered to be started. Further, the information on the termination of access control may be information (or an indicator) explicitly indicating the termination of access control. Also, without the information explicitly indicating the termination, when the remote UE does not receive the information (1) to (4) from the relay UE, access control may be considered to be terminated.

6) Information on whether the relay UE is in the connected mode or the idle mode (i.e., information indicating whether the current relay mode is the connected mode or the idle mode or indicating whether a switch to the connected mode is started)

When the remote UE fails to receive information relating to the connected mode from the relay UE, the relay UE may be considered to be in the idle mode. On the contrary, when the remote UE fails to receive information relating to the idle mode from the relay UE, the relay UE may be considered to be in the connected mode.

7) Relay service code of the relay UE

The relay service code may be preset information from the network.

8) User information identifier (User Info ID) of the relay UE

The user information identifier may be preset information from the network.

The discovery response message may be provided to a plurality of UEs, may be provided only to a particular UE, or may be broadcast to all UEs through a dedicated channel. The discovery response message may be provided periodically or on demand.

According to embodiments, when the remote UE detects a relay UE that starts access control, the remote UE does not attempt to connect to the relay UE that starts access control but may attempt to connect to another UE that does not start access control.

The remote UE may obtain the access class information, the access control mechanism-related parameter information, the configuration information set in the relay UE, and the like from the relay UE via 1) to 4).

According to an embodiment, the information received by the remote UE from the relay UE via 1) to 4) may not correspond to information that the remote UE has. For example, the remote UE has an access class of "7", while and the obtained access class of the relay UE may be "3". Also, the remote UE is configured for EAB and/or ACDC, while the received parameter information may indicate "not be configured for EAB and/or ACDC". In addition, the remote UE may be configured for NAS signaling low priority and/or overriding NAS signaling low priority, while the received parameter information may indicate "not be configured for NAS signaling low priority and/or overriding NAS signaling low priority".

When the parameter information does not match the information that the remote UE has, the remote UE may select a relay UE to which the remote UE attempts to connect through the following operation (S1240). The remote UE may attempt to connect to the selected relay UE in order to access the network through the selected relay UE (S1250).

(1) When the information that the remote UE has partially matches the discovery response message received from the relay UE, the remote UE may select a relay UE based on the priorities. For example, according to an embodiment, the priorities may be as follows:

1) First, the remote UE may select a relay UE that has transmitted the same access class as that of the remote UE and may attempt to connect to the selected relay UE.

2) Second, when step 1) failed, the remote UE may select a relay UE that has transmitted the same configuration information (particularly, NAS signaling low priority and overriding NAS signaling low priority) as that of the remote UE and may attempt to connect to the selected relay UE.

3) Third, when steps 1) and 2) failed, the remote UE may select a relay UE that has transmitted the same EAB-related information (particularly, EAB and overriding EAB) as that of the remote UE among access control mechanism information on the remote UE and may attempt to connect to the selected relay UE.

4) Fourth, when steps 1) to 3) failed, the remote UE may select a relay UE that has transmitted the same ACDC-related information as that of the remote UE among the access control mechanism information on the remote UE and may attempt to connect to the selected relay UE.

(2) The priorities may be determined based on separate configuration information provided by the network (BS, MME/SGSN, or carrier network). The priorities may be transmitted via an OMA-DM, a USIM, an SIB, or a dedicated channel.

(3) When there is no relay UE that has transmitted the same access class information, currently set access control mechanism information, and currently set configuration information as those of the remote UE in the discovery process for detecting a relay UE to which the remote UE connects, the remote UE may select one of relay UEs that have transmitted different information and may attempt to connect to the selected relay UE.

(4) Among the foregoing relay UE selection methods (1) to (3), a method for selecting a relay UE may be determined based on separate configuration information provided by the network (BS, MME/SGSN, or carrier network). The network may transmit determined separate configuration information to the remote UE through an OMA-DM, a USIM, an SIB, or a dedicated channel. The determined separate configuration information may be one of the relay UE selection methods (1) to (3) or may be a combination of two or more of the relay UE selection methods.

When there is no relay UE that has transmitted the same access class information, currently set access control mechanism information, and currently set configuration information as those of the remote UE, the remote UE may select a relay UE to connect to based on a direct discovery operation for public safety.

The direct discovery for public safety is described in sections 4.5.1.1.2.3.2 and 4.5.1.1.2.3.4 "Direct Discovery for Public Safety" of 3GPP TS 23.303 (2017-06). Additional information not directly used in the discovery may be disclosed via a single or individual announcement message in a "Relay Discovery Additional Information" type using a PC-5D protocol stack, such as a relayed TMGI and the ECGI of the serving cell.

That is, the remote UE may attempt to detect a relay UE that provides a relay service code and user information identifier information, which match a preconfigured relay service code and preconfigured user information identifier (User Info ID) information of the remote UE, and may attempt to connect to the detected relay UE. This connection attempt may be performed before the relay UE selection methods (1) to (3) or after the relay UE selection methods (1) to (3) depending on the embodiment.

According to an embodiment, the connection attempt may be performed independently of the relay UE selection methods (1) to (3). That is, according to an embodiment, independently of whether the relay UE selection methods (1) to (3) are performed, the remote UE may detect a relay UE that provides a relay service code and user information identifier information, which match the preconfigured relay service code and the preconfigured user information identifier information of the remote UE, and may attempt to connect to the detected relay UE.

According to an embodiment, when there is a plurality of relay UEs to which the remote UE attempts to connect while performing the relay UE selection methods (1) to (4), the remote UE may select a relay UE having a high signal strength or may select a relay UE based on a configuration/policy from the network (e.g., BS, MME/SGSN, or carrier network) and may attempt to connect to the selected relay UE.

FIG. 12b illustrates a method for a relay UE to select a remote UE to which the relay UE transmits a response message in discovery model B.

Referring to FIG. 12b, in discovery model B, the relay UE may receive an announcement message for detecting a relay UE from a remote UE (S1260). The announcement message may be a PC5 solicitation message.

The announcement message may include at least one of the following pieces of information.

i) Access class information on the remote UE ii) Access control mechanism information (EAB, overriding EAB, and ACDC) set in the remote UE iii) Configuration information (e.g., NAS signaling low priority and overriding NAS signaling low priority (=dual priority)) set in the remote UE iv) Relay service code of the remote UE The relay service code may be preset information from the network.

v) User information identifier (User Info ID) of the remote UE

The user information identifier may be preset information from the network.

The announcement message may be provided to a plurality of UEs, may be provided only to a particular UE, or may be broadcast to all UEs through a dedicated channel. The announcement message may be provided periodically or on demand When the relay UE, which has received the announcement message from the remote UE trying to discover a relay UE, applies access control in network congestion (S1270), the relay UE may select a remote UE to which the relay UE transmits a discovery response message based on the received announcement message (S1275). The relay UE may transmit the discovery response message to the remote UE selected based on the announcement message (S1280). The discovery response message may be a PC5 response message or a new response message. Depending on the embodiment, the relay UE may use any one of PC5-Signaling, PC5-Discovery, PC5-U, and PPC connection establishment to transmit the discovery response message. Upon receiving the discovery response message, the remote UE may attempt to connect to the relay UE that has transmitted the discovery response message (S1290).

The relay UE may perform any one of the following methods in order to select a remote UE to which the relay UE transmits a response message.

(1) The relay UE may receive the access class information on the remote UE, the access control mechanism information set in the remote UE, and the configuration information set in the remote UE via i) to iii) and may transmit the discovery response message to a remote UE that has transmitted the same access class information, access control mechanism information, and configuration information as those of the relay UE.

(2) When there is no remote UE that has transmitted the same access class information, access control mechanism information, and configuration information as those of the relay UE (that is, when the relay UE does not discover a remote UE that has transmitted the same access class information, access control mechanism information, and configuration information as those of the relay UE), the relay UE may transmit the discovery response message to a remote UE that has transmitted access class information, access control mechanism information, and configuration information, some of which match those of the relay UE. Here, the relay UE may select a remote UE to which the discovery response message is transmitted based on the priorities, which may be as follows.

1) First, the relay UE may select a remote UE that has transmitted the same access class as that of the relay UE and may transmit the discovery response message to the selected relay UE.

2) Second, when step 1) failed, the relay UE may select a remote UE that has transmitted the same configuration information (particularly, NAS signaling low priority and overriding NAS signaling low priority) as that of the relay UE and may transmit the discovery response message to the selected relay UE.

3) Third, when steps 1) and 2) failed, the relay UE may select a remote UE that has transmitted the same EAB-related information (particularly, EAB and overriding EAB) as that of the relay UE among access control mechanism information on the relay UE and may transmit the discovery response message to the selected relay UE.

4) Fourth, when steps 1) to 3) failed, the relay UE may select a remote UE that has transmitted the same ACDC-related information (particularly, ACDC configuration and/or ACDC category) as that of the relay UE among the access control mechanism information on the relay UE and may transmit the discovery response message to the selected relay UE.

According to an embodiment, the priorities may be determined based on separate configuration information provided by the network (BS, MME/SGSN, or carrier network). The priorities may be transmitted via an OMA-DM, a USIM, an SIB, or a dedicated channel.

(3) When there is no remote UE that has transmitted the same access class information, currently set access control mechanism information, and currently set configuration information as those of the relay UE in the discovery process, the relay UE may select one of remote UEs that have transmitted unmatching information and may attempt a discovery connection to the selected relay UE.

(4) The foregoing remote UE selection methods (1) to (3) may be performed based on separate configuration information provided by the network (BS, MME/SGSN, or carrier network). The network may transmit determined separate configuration information to the remote UE through an OMA-DM, a USIM, an SIB, or a dedicated channel. The determined separate configuration information may be one of the remote UE selection methods (1) to (3) or may be a combination of two or more of the remote UE selection methods.

When there is found no remote UE that has transmitted the same access class information, currently set access control mechanism information, and currently set configuration information as those of the relay UE using the methods (1) to (3), the relay UE may select a remote UE to which the discovery response message is transmitted based on a direct discovery operation for public safety.

The direct discovery for public safety is described in sections 4.5.1.1.2.3.2 and 4.5.1.1.2.3.4 "Direct Discovery for Public Safety" of 3GPP TS 23.303 (2017-06). Additional information not directly used in the discovery may be disclosed via a single or individual announcement message in a "Relay Discovery Additional Information" type using a PC-5D protocol stack, such as a relayed TMGI and the ECGI of the serving cell.

That is, the relay UE may attempt to detect a remote UE that provides a relay service code and user information identifier information, which match a preconfigured relay service code and preconfigured user information identifier (User Info ID) information of the remote UE, and may transmit the discovery response message to the detected relay UE. This operation may be performed before the remote UE selection methods (1) to (3) or after the remote UE selection methods (1) to (3) depending on the embodiment.

According to an embodiment, the operation may be performed independently of the remote UE selection methods (1) to (3). That is, according to an embodiment, independently of whether the remote UE selection methods (1) to (3) are performed, the relay UE may detect a remote UE that provides a relay service code and user information identifier information, which match the preconfigured relay service code and the preconfigured user information identifier information of the relay UE, and may attempt to connect to the detected remote UE.

According to an embodiment, when the relay UE discovers a plurality of remote UEs while performing the remote UE selection methods (1) to (4), the relay UE may select a remote UE having a high signal strength or may transmit the discovery response message to a remote UE selected based on a configuration/policy from the network (e.g., BS, MME/SGSN, or carrier network).

When the relay UE, which has received the announcement message (e.g., a PC5 solicitation message) from the remote UE, applies access control in network congestion, the announcement message (e.g., a PC5 solicitation message) may further include the following information.

vi) Information on the start of access control and/or information on the termination of access control Here, the information on the start of access control may be information (or an indicator) explicitly indicating the start of access control. Also, without the information explicitly indicating the start, the remote UE may consider that access control is started based on autonomous determination thereof. Further, the information on the termination of access control may be information (or an indicator) explicitly indicating the termination of access control. Also, without the information explicitly indicating the termination, the remote UE may consider that access control is terminated based on autonomous determination thereof.

vii) Information on whether the relay UE is in the connected mode or the idle mode (i.e., information indicating whether the current relay mode is the connected mode or the idle mode or indicating whether a switch to the connected mode is started)

When the remote UE fails to receive information relating to the connected mode from the relay UE, the relay UE may be considered to be in the idle mode. On the contrary, when the remote UE fails to receive information relating to the idle mode from the relay UE, the relay UE may be considered to be in the connected mode.

III. Access Control Applicability

1) When Access Control is Performed by a Remote UE

A remote UE can recognize access control performed by a relay UE regardless of relay UE selection in discovery model A described in FIG. 11 and discovery model B described in FIG. 12a.

According to an embodiment, when the relay UE applies access control in a network congestion condition, a particular message may be transmitted to the remote UE. According to an embodiment, the particular message may be transmitted over a dedicated channel. The particular message includes 1) access class information on the relay UE to 6) information on whether the relay UE is in the connected mode or the idle mode, which are illustrated in the access control information of discovery model A described in FIG. 11 and the discovery response message of discovery model B described in FIG. 12a. The particular message may be provided to at least one UE or may be broadcast to all UEs through the dedicated channel According to an embodiment, the particular message may be transmitted using any one of PC5-Signaling, PC5-Discovery, PC5-U, and RRC connection establishment.

According to an embodiment, when the remote UE connects to a network, transmits signaling, or transmits data, the remote UE may check whether the relay UE applies access control and may transmit a message for checking whether access control is applied to the relay UE. The message for checking whether access control is applied may be a new PC5 message, an NAS signaling message, or an RRC signaling message. The message for checking whether access control is applied may be transmitted to the relay UE through a dedicated channel. The relay UE may transmit a response message to the remote UE in response to the message for checking whether access control is applied. The response message may be transmitted through a dedicated channel. The response message includes 1) access class information on the relay UE to 6) information on whether the relay UE is in the connected mode or the idle mode, which are illustrated in the access control information of discovery model A described in FIG. 11 and the discovery response message of discovery model B described in FIG. 12a. The response message may be provided to at least one UE or may be broadcast to all UEs through the dedicated channel According to an embodiment, the response message may be transmitted using any one of PC5-Signaling, PC5-Discovery, PC5-U, and RRC connection establishment.

2) When Access Control is Performed by a Relay UE

A remote UE can recognize access control performed by a relay UE regardless of relay UE selection in discovery model A and discovery model B.

According to an embodiment, when the relay UE applies access control in a network congestion condition, a particular message may be transmitted to the remote UE. According to an embodiment, the particular message may be transmitted over a dedicated channel. The particular message includes 1) access class information on the relay UE to 6) information on whether the relay UE is in the connected mode or the idle mode, which are illustrated in the access control information of discovery model A described in FIG. 11, or 1) access class information on the remote UE to 3) configuration information set in the remote UE, which are illustrated in the discovery response message of discovery model B described in FIG. 12b. The particular message may be provided to at least one UE or may be broadcast to all UEs through a dedicated channel. According to an embodiment, the particular message may be transmitted using any one of PC5-Signaling, PC5-Discovery, PC5-U, and RRC connection establishment.

According to an embodiment, when the remote UE connects to a network, transmits signaling, or transmits data, the remote UE may check whether the relay UE applies access control and may transmit a message for checking whether access control is applied to the relay UE. The message for checking whether access control is applied may be a new PC5 message, an NAS signaling message, or an RRC signaling message. The message for checking whether access control is applied may be transmitted to the relay UE through a dedicated channel. The relay UE may transmit a response message to the remote UE in response to the message for checking whether access control is applied. The response message may be transmitted through a dedicated channel. The response message includes 1) access class information on the relay UE to 6) information on whether the relay UE is in the connected mode or the idle mode, which are illustrated in the access control information of discovery model A described in FIG. 11, or 1) access class information on the remote UE to 3) configuration information set in the remote UE, which are illustrated in the discovery response message of discovery model B described in FIG. 12b. The response message may be provided to at least one UE or may be broadcast to all UEs through the dedicated channel. According to an embodiment, the response message may be transmitted using any one of PC5-Signaling, PC5-Discovery, PC5-U, and RRC connection establishment.

IV. ACB, SSAC, and SCB Skip (1) Access Class Barring (ACB)

1) When Access Control is Performed by a Remote UE

In the case where a remote UE receives access control information described in discovery model A or a discovery response message described in discovery model B, when the remote UE connects to a network, transmits signaling, or transmits data through PC 5-Signaling, PC 5-Discovery, PC 5-U or RRC connection establishment, the remote UE may perform an access class barring (ACB) mechanism when switching from the idle mode to the connected mode.

When the network provides barring information related to ACB and service-specific access control (SSAC), the remote UE may simultaneously perform ACB and SSAC, thereby performing access control (double barring check).

2) When Access Control is Performed by a Relay UE

In the case where a remote UE receives access control information described in discovery model A or a discovery response message described in discovery model B and is connected to a relay UE, when the remote UE connects to a network, transmits signaling, or transmits data through PC 5-Signaling, PC 5-Discovery, PC 5-U or RRC connection establishment, the remote UE may transmit signaling and data to the relay UE without performing ACB. Upon receiving the signaling and the data from the remote UE, the relay UE may perform an ACB mechanism in order to transmit the signaling and the data to the network when switching from the idle mode to the connected mode.

Thereafter, in performing ACB, the relay UE may operate as follows.

i) The relay UE may perform ACB based on access class information on the relay UE, and may transmit the signaling and/or data received from the remote UE to the network when passing ACB. That is, the relay UE may perform ACB based on the access class information on the relay UE regardless of access class information, access control mechanism information, and/or the configuration information on the remote UE.

ii) The relay UE may perform ACB based on access class information on the remote UE received from the remote UE regardless of access class information on the relay UE, and may transmit the signaling and/or data received from the remote UE to the network when passing ACB.

iii) The signaling and/or data transmission methods described in i) and ii) may be determined based on separate configuration information provided by the network (BS, MME/SGSN, or carrier network). The network may transmit the determined separate configuration information to the remote UE through an OMA-DM, a USIM, an SIB, or a dedicated channel. The network may perform the above two embodiments of signaling and/or data transmission methods individually or in combination.

When the network provides barring information related to ACB and SSAC, the relay UE may simultaneously perform ACB and SSAC, thereby performing access control (double barring check).

(2) Service-Specific Access Control (SSAC)

1) When Access Control is Performed by a Remote UE

In the case where a remote UE receives access control information described in discovery model A or a discovery response message described in discovery model B, when the remote UE connects to a network, transmits signaling, or transmits data for MMTEL voice and MMTEL video through PC 5-Signaling, PC 5-Discovery, PC 5-U or RRC connection establishment, the remote UE may perform an SSAC mechanism regardless of the idle mode to the connected mode.

When the network provides barging information related to ACB and SSAC, the remote UE may simultaneously perform ACB and SSAC, thereby performing access control.

2) When Access Control is Performed by a Relay UE (i) In the case where a remote UE receives access control information described in discovery model A or a discovery response message described in discovery model B and is connected to a relay UE, when the remote UE connects to a network, transmits signaling, or transmits data for MMTEL voice and MMTEL video through PC 5-Signaling, PC 5-Discovery, PC 5-U or RRC connection establishment, the relay UE may perform ACB described above in (1), without performing SSAC, if in the idle mode.

However, when the relay UE is in the connected mode, the relay UE may transmit the signaling or the data to the network without performing SSAC and ACB.

(ii) In the case where a remote UE receives access control information described in discovery model A or a discovery response message described in discovery model B and is connected to a relay UE, the remote UE may receive access control mechanism-related parameter information (ACB, SSAC, ACB skip, EAB, and ACDC) provided by a serving network via an SIB (SIB2, SIB14, or a new SIB).

The access control mechanism-related parameter information may include ACB barring parameters (barring rate and barring time), SSAC barring parameters for MMTEL voice and MMTEL video, ACB skip parameters for MMTEL voice and MMTEL video, SMS over IP and SMS (over NAS), ACDC parameters (barring rate and barring time for an ACDC category), barring parameters for CSFB, emergency contact information, and high priority information.

When the remote UE connects to a network, transmits signaling, and/or transmits data for MMTEL voice and MMTEL video through PC 5-Signaling, PC 5-Discovery, PC 5-U or RRC connection establishment, the remote UE may perform an SSAC mechanism. SSAC may be performed regardless of whether the remote UE is in the idle mode or the connected mode.

Here, the relay UE may operate as described above in 1). Further, when the network provides barging information related to ACB and SSAC, the remote UE may simultaneously perform ACB and SSAC (double barring check).

(3) ACB Skip

1) When Access Control is Performed by a Remote UE

In the case where a remote UE receives access control information described in discovery model A or a discovery response message described in discovery model B, when the remote UE connects to a network, transmits signaling, or transmits data through PC 5-Signaling, PC 5-Discovery, PC 5-U or RRC connection establishment, the remote UE may perform an ACB skip mechanism when switching from the idle mode to the connected mode.

The ACB skip mechanism may mean that in performing network connection/signaling transmission/data transmission for MMTEL voice, MMTEL video, SMS (over IP), or SMS (over NAS), the remote UE requests network connection/signaling transmission/data transmission without performing an ACB mechanism.

2) When Access Control is Performed by a Relay UE

In the case where a remote UE receives access control information described in discovery model A or a discovery response message described in discovery model B and is connected to a relay UE, when the remote UE connects to a network, transmits signaling, or transmits data through PC 5-Signaling, PC 5-Discovery, PC 5-U or RRC connection establishment, the relay UE may perform an ACB skip mechanism when switching from the idle mode to the connected mode.

The ACB skip mechanism may mean that in performing network connection/signaling transmission/data transmission for MMTEL voice, MMTEL video, SMS (over IP), or SMS (over NAS), the remote UE requests network connection/signaling transmission/data transmission without performing an ACB mechanism.

V. EAB and ACDC (1) Extended Access Barring (EAB)

1) When Access Control is Performed by a Remote UE

In the case where a remote UE is configured to perform EAB through a management object (MO) or a USIM provided from a network and receives access control information described in discovery model A or a discovery response message described in discovery model B, when the remote UE connects to the network, transmits signaling, or transmits data through PC 5-Signaling, PC 5-Discovery, PC 5-U or RRC connection establishment, the remote UE may perform an EAB mechanism when switching from the idle mode to the connected mode.

Further, in the case where the remote UE is configured to perform overriding EAB, along with or separately from EAB, through the management object (MO) or the USIM provided from the network and receives the access control information described in discovery model A or the discovery response message described in discovery model B, when the remote UE connects to the network, transmits signaling, or transmits data through PC 5-Signaling, PC 5-Discovery, PC 5-U or RRC connection establishment, the remote UE may perform an EAB mechanism and an overriding EAB mechanism when switching from the idle mode to the connected mode.

2) When Access Control is Performed by a Relay UE

In the case where a remote UE is configured to perform EAB and/or overriding EAB through a management object (MO) or a USIM provided from a network, and retrieves and selects a relay UE through discovery model A or discovery model B, when the remote UE connects to the network, transmits signaling, or transmits data through PC 5-Signaling, PC 5-Discovery, PC 5-U or RRC connection establishment (that is, when the remote UE switches from the idle mode to the connected mode), the remote UE may provide EAB configuration information and/or overriding EAB configuration information to the relay UE.

When the relay UE is configured by the network to perform EAB or overriding EAB and receives the EAB configuration information from the remote UE, the remote UE may perform an EAB mechanism when network connection, signaling transmission, or data transmission is performed.

Further, when the relay UE is configured by the network to perform EAB or overriding EAB and receives the EAB configuration information from the remote UE, the remote UE may perform an overriding EAB mechanism when network connection, signaling transmission, or data transmission is performed. That is, the remote UE may not perform but bypass EAB when network connection, signaling transmission, or data transmission is performed.

According to an embodiment, when the relay UE is configured by the network not to perform EAB or overriding EAB and receives the EAB configuration information from the remote UE, the relay UE may perform an ACB mechanism instead of performing an EAB mechanism.

Further, when the relay UE is configured by the network not to perform EAB or overriding EAB and receives the EAB configuration information and/or the overriding EAB configuration information from the remote UE, the relay UE may perform an ACB mechanism instead of performing an EAB mechanism or may not perform but bypass an EAB mechanism, an overriding EAB mechanism, and an ACB mechanism. That is, it may be determined depending on the configuration (policy or information) from the network whether to perform the EAB mechanism, the overriding EAB mechanism, and/or the ACB mechanism.

(2) Application-Specific Congestion Control for Data Communication (ACDC)

1) When Access Control is Performed by a Remote UE

In the case where a remote UE is configured to perform ACDC through a management object (MO) or a USIM provided from a network and receives access control information described in discovery model A or a discovery response message described in discovery model B, when the remote UE connects to the network, transmits signaling, or transmits data through PC 5-Signaling, PC 5-Discovery, PC 5-U or RRC connection establishment, the remote UE may perform an ACDC mechanism when switching from the idle mode to the connected mode.

In ACB, SSAC, ACB skip, EAB, or ACDC, when the remote UE is configured to perform an NAS signaling low priority and/or an overriding NAS signaling low priority through the management object (MO) or the USIM provided from the network, the remote UE may also perform a corresponding access control mechanism.

2) When Access Control is Performed by a Relay UE

In the case where a remote UE is configured to perform ACDC through a management object (MO) or a USIM provided from a network and is connected to a relay UE through access control information described in discovery model A or discovery model B, when the remote UE connects to the network, transmits signaling, or transmits data through PC 5-Signaling, PC 5-Discovery, PC 5-U or RRC connection establishment (when the remote UE switches from the idle mode to the connected mode), the remote UE may provide ACDC category information about network connection, signaling transmission, or data transmission to the relay UE.

When the relay UE is configured to perform ACDC through the network and receives the ACDC category information from the remote UE, the relay UE may perform an ACDC mechanism based on the ACDC category information.

Further, the remote UE may provide App-ID (or App-IDs) information to the relay UE. According to an embodiment, the App-ID (or App-IDs) may be provided along with the ACDC category. Here, the NAS of the remote UE may provide the AS (RRC) of the remote UE with the App-ID (or App-IDs) along with the ACDC category.

According to another embodiment, the App-ID (or App-IDs) may be provided separately from the ACDC category. Here, the NAS of the remote UE may provide the AS (RRC) of the remote UE with the App-ID (or App-IDs) separately from the ACDC category.

When the relay UE is configured to perform ACDC through a management object (MO) or a USIM provided from the network and receives the ACDC category information and the App-ID or receives only the App-ID from the remote UE, the relay UE may determine ACDC category information on the relay UE corresponding to the received App-ID and may perform an ACDC mechanism based on the determined ACDC category information.

The AS (RRC) of the relay UE may provide the NAS of the relay UE with the App-ID information received from the remote UE. The NAS of the relay UE may determine ACDC category information corresponding to the provided App-ID and may transmit the determined ACDC category information to the AS of the relay UE. The AS of the relay UE may perform an ACDC mechanism based on the determined ACDC category information.

According to an embodiment, when the relay UE is configured not to perform ACDC through the management object (MO) or the USIM provided from the network and receives the ACDC category information from the remote UE, the relay UE may perform an ACB mechanism instead of performing an ACDC mechanism. According to another embodiment, when the relay UE is configured not to perform ACDC through the management object (MO) or the USIM provided from the network and receives the ACDC category information from the remote UE, the relay UE may not perform an access control mechanism.

Further, according to an embodiment, when the relay UE is configured not to perform ACDC through the management object (MO) or the USIM provided from the network and receives the ACDC category information and the App-ID or receives only the App-ID from the remote UE, the relay UE may perform an ACB mechanism instead of performing an ACDC mechanism. According to another embodiment, when the relay UE is configured not to perform ACDC through the management object (MO) or the USIM provided from the network and receives the ACDC category information and the App-ID or receives only the App-ID from the remote UE, the relay UE may not perform an access control mechanism.

In ACB, SSAC, ACB skip, EAB, or ACDC, when the remote UE and/or the relay UE is configured to perform an NAS signaling low priority and/or an overriding NAS signaling low priority through the management object (MO) or the USIM provided from the network, the remote UE may also perform a corresponding access control mechanism.

VI. Operation of Remote UE and Relay UE after Access Control Mechanism of ACB, SSAC, ACB Skip, EAB, or ACDC is Performed (1) Operation of Remote UE 1) When Access Control is Performed by a Remote UE As described above, when passing an access control mechanism of ACB, SSAC, ACB skip, EAB, or ACDC (that is, when access to a cell is successful), the remote UE may request connection for network connection/signaling transmission/data transmission from a relay UE using PC5-Signalling, PC5-Discovery, PC5-U, or RRC connection establishment.

When the AS (RRC) of the remote UE passes the access control mechanism of ACB, SSAC, ACB skip, EAB, or ACDC, the NAS or the AS (RRC) of the remote UE may request a connection for network connection/signaling transmission/data transmission from a relay UE using PC5-Signalling, PC5-Discovery, PC5-U, or RRC connection establishment.

However, when the AS (RRC) of the remote UE does not pass the access control mechanism of ACB, SSAC, ACB skip, EAB, or ACDC (that is, when access to the cell is barred), the AS (RRC) of the remote UE may transmits connection failure information to the NAS of the remote UE, and the NAS of the remote UE may not make an NAS signaling request for network connection/signaling transmission/data transmission until information indicating the alleviation of access barring is received from the AS (RRC) of the remote UE. Here, the remote UE may operate a barring timer. When the barring timer expires, the AS (RRC) of the remote UE may report the alleviation of access barring to the NAS of the remote UE.

When passing the access control mechanism of ACB, SSAC, ACB skip, EAB, or ACDC, the remote UE may transmit a request for connection for network connection/signaling transmission/data transmission to the relay UE using PC5-Signalling, PC5-Discovery, PC5-U, or RRC connection establishment. When the remote UE receives a connection request rejection (or failure) message from the relay UE in response to the request, the AS (RRC) of the remote UE may transmit connection failure information to the NAS of the remote UE. Here, the NAS of the remote UE may suspend the NAS signaling request for network connection/signaling transmission/data transmission.

The connection failure information may include information about a cause of the failure, such as low layer failure, radio link failure, or cell barring. The AS (RRC) of the remote UE may transmit the information about the cause of the failure to the NAS of the remote UE. Here, the information about the cause of the failure may be information indicating transmission/connection failure from the relay UE. The information about the cause of the failure may further include the value of the barring timer.

The AS (RRC) of the remote UE may transmit the connection failure information, which indicates that transmission/connection has failed, to the NAS of the remote UE, and the NAS of the remote UE may not make an NAS signaling request for network connection/signaling transmission/data transmission until information indicating the alleviation of access barring is received from the AS (RRC) of the remote UE. Here, the remote UE may operate the barring timer. When the barring timer expires, the AS (RRC) of the remote UE may report the alleviation of access barring to the NAS of the remote UE.

When the relay UE accepts the request for the connection for network connection/signaling transmission/data transmission, the remote UE may transmit signaling (NAS signaling) or data to transmit to the relay UE.

Alternatively, when the remote UE performs an access control mechanism of ACB, SSAC, ACB skip, EAB, or ACDC and passes the access control mechanism, the remote UE may transmit signaling (NAS signaling) or data to transmit to the relay UE regardless of whether the request for the connection for network connection/signaling transmission/data transmission is accepted.

2) When Access Control is Performed by a Relay UE

When a relay UE does not pass an access control mechanism of ACB, SSAC, ACB skip, EAB, or ACDC (that is, when access to a cell is barred), the relay UE may transmit failure information indicating that connection is barred to a remote UE.

The AS of the remote UE may transmit the failure information to the NAS of the remote UE. The NAS of the remote UE may not make an NAS signaling request for network connection, signaling transmission, or data transmission until information indicating the alleviation of access barring is received from the AS (RRC) of the remote UE.

(2) Operation of Relay UE

1) When Access Control is Performed by a Remote UE

When a remote UE performs an access control mechanism of ACB, SSAC, ACB skip, EAB, or ACDC and passes the access control mechanism, the remote UE may transmit a request for connection for network connection/signaling transmission/data transmission to a relay UE using PC5-Signalling, PC5-Discovery, PC5-U, or RRC connection establishment.

When the relay UE, which has received the request, is in the idle mode, the relay UE may perform a request for connection to a network (BS) in order to switch to the connected mode. Then, when successfully connected to the network, the relay UE may accept the connection request received from the remote UE. Subsequently, when signaling (NAS signaling) or data that the remote UE desires to transmit is received from the remote UE, the relay UE may transmit the received signaling (NAS signaling) or data to the network using one of PC5-Signalling, PC5-Discovery, PC5-U, and RRC connection establishment.

When the remote UE passes the access control mechanism and thus the relay UE receives signaling (NAS signaling) or data that the remote UE desires to transmit from the remote UE, the relay UE may transmit signaling or data to the network without performing an additional access control mechanism.

When the request for the connection to the network (BS) is rejected (or fails) due to low layer failure, radio link failure, or cell barring, the relay UE may transmit, to the remote UE, connection failure information indicating that the request for the connection for network connection/signaling transmission/data transmission from the remote UE has been rejected (has failed).

The connection failure information may include information about a cause of the failure, such as low layer failure, radio link failure, or cell barring. The information about the cause of the failure may be information indicating transmission/connection failure from the relay UE. The information about the cause of the failure may further include the value of a barring timer.

The AS (RRC) of the remote UE may transmit the connection failure information, which indicates that transmission/connection has failed, to the NAS of the remote UE, and the NAS of the remote UE may not make an NAS signaling request for network connection/signaling transmission/data transmission until information indicating the alleviation of access barring is received from the AS (RRC) of the remote UE. Here, the remote UE may operate the barring timer using the value of the barring timer provided from the relay UE. When the barring timer expires, the AS (RRC) of the remote UE may report the alleviation of access barring to the NAS of the remote UE.

In the case where access to a cell is barred, when the remote UE performs an access control mechanism of ACB, SSAC, ACB skip, EAB, or ACDC and passes the access control mechanism, the relay UE may receive, from the remote UE, signaling (NAS signaling) or data that the remote UE desires to transmit. Here, the relay UE may transmit the signaling (NAS signaling) or data to the network without performing an additional access control mechanism, overriding that access to the cell is barred.

2) When Access Control is Performed by a Relay UE

When a relay UE performs an access control mechanism of ACB, SSAC, ACB skip, EAB, or ACDC and passes the access control mechanism, the relay UE, which has received a request for connection for network connection/signaling transmission/data transmission from a remote UE, may attempt connection to a network (BS). When the connection is successfully established, the relay UE may accept the request for the connection from the remote UE.

Subsequently, upon receiving signaling (NAS signaling) or data from the remote UE, the relay UE may transmit the received signaling (NAS signaling) or data to the network using PC5-Signalling, PC5-Discovery, PC5-U, or RRC connection establishment. When the relay UE passes the access control mechanism and receives the signaling (NAS signaling) or data from the remote UE, the relay UE may not perform an access control mechanism for transmitting the signaling (NAS signaling) or data.

According to an embodiment, when the relay UE performs an access control mechanism of ACB, SSAC, ACB skip, EAB, or ACDC but does not pass the access control mechanism or when the request for connection to the network (BS) is rejected due to low layer failure or radio link failure, the relay UE may transmit a connection request rejection message to the remote UE. The connection request rejection message may include the value of a reason for the rejection of the connection request. The value of the reason may be a value indicating connection request failure. According to an embodiment, the remote UE may further receive a timer value.

The AS (RRC) of the remote UE may transmit failure information indicating the failure of transmission/connection to the NAS of the remote UE, and the NAS of the remote UE may not make an NAS signaling request for network connection/signaling transmission/data transmission until information indicating the alleviation of access barring is received from the AS of the remote UE.

Here, the remote UE may operate a barring timer based on the timer value received from the relay UE. When the barring timer expires, the AS (RRC) of the remote UE may report the alleviation of access barring to the remote UE.

VII. Relay UE in Connected Mode

1) When Access Control is Performed by a Remote UE

According to an embodiment, when a remote UE performs network connection/signaling transmission/data transmission using one of PC5-Signalling, PC5-Discovery, PC5-U, and RRC connection establishment, if a relay UE is in the idle mode, the relay UE may switch to the connected mode. Here, when the AS of the relay UE receives a request for network connection/signaling transmission/data transmission from the remote UE, the AS of the relay UE may perform an RRC connection establishment procedure in order to perform network connection/signaling transmission/data transmission requested by the remote UE through a network LTE-Uu (or relay-user plane). According to an embodiment, the relay UE may perform an additional (separate) access control mechanism in order to perform the RRC connection establishment procedure.

According to another embodiment, when the remote UE performs network connection/signaling transmission/data transmission using one of PC5-Signalling, PC5-Discovery, PC5-U, and RRC connection establishment, if the relay UE is in the connected mode, the relay UE may transmit network connection/signaling/data requested by the remote UE to the network without an RRC connection establishment procedure by the AS (RRC) of the relay UE (that is, without the remote UE performing an access control mechanism described in the present invention).

2) When Access Control is Performed by a Relay UE

According to an embodiment, when a remote UE performs network connection/signaling transmission/data transmission using one of PC5-Signalling, PC5-Discovery, PC5-U, and RRC connection establishment, if a relay UE is in the connected mode, the relay UE may perform network connection/signaling transmission/data transmission requested by the remote UE to the network through the LTE-Uu (or relay-user plane) without an RRC connection establishment procedure by the AS (RRC) of the relay UE (that is, without performing an access control mechanism).

According to another embodiment, when the remote UE performs network connection/signaling transmission/data transmission using one of PC5-Signalling, PC5-Discovery, PC5-U, and RRC connection establishment, if the relay UE is in the connected mode, the remote UE may recognize that the relay UE is in the connected mode through information about whether the relay UE is in the connected mode or in the idle mode. Here, the relay UE may perform network connection/signaling transmission/data transmission requested by the remote UE to the network without performing an access control mechanism.

Figure 13A:
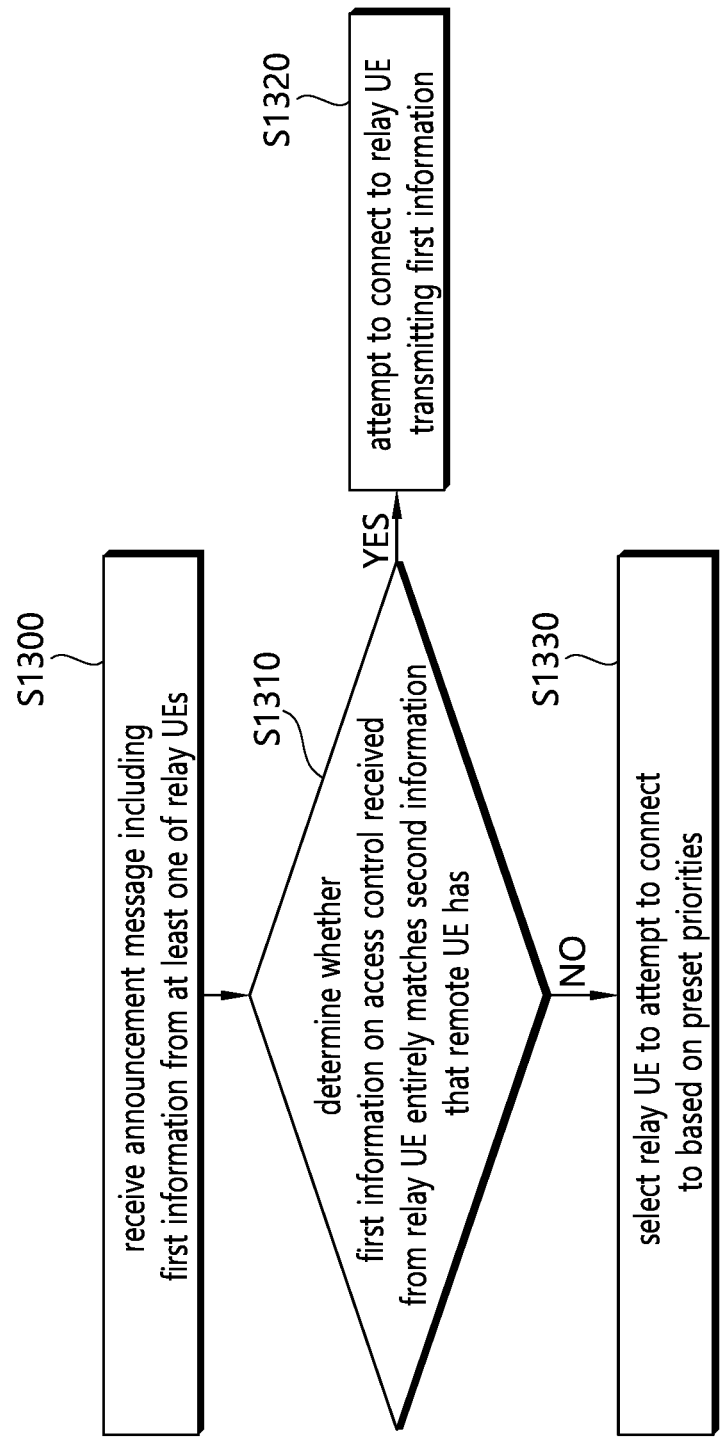
FIG. 13a is a flowchart illustrating a process for a remote UE to select a relay UE when access control is applied due to network congestion according to an embodiment of the present invention.

FIG. 13a is a flowchart illustrating a process for a remote UE to select a relay UE when access control is applied due to network congestion according to an embodiment of the present invention.

Referring to FIG. 13a, a remote UE may receive first information on access control from at least one relay UE (S1300). According to discovery model A illustrated in FIG. 11, the first information may be access control information. According to discovery model B illustrated in FIG. 12a, the first information may be a discovery response message.

The first information may include access class information on the relay UE, access control mechanism information on the relay UE, and configuration information on the relay UE.

First, the remote UE may compare the first information with second information that the remote UE has (S1310). The second information may include access class information on the remote UE, access control mechanism information on the remote UE, and configuration information on the remote UE.

When the information included in the first information entirely matches the information included in the second information (YES in S1310), the remote UE may transmit a response message to a relay UE that has transmitted the matching first information among the relay UEs and may attempt to connect to the relay UE (S1320).

When the information included in the first information does not entirely match the information included in the second information (NO in S1310), the remote UE may attempt to connect to a relay UE corresponding to one or some of the access class information, the access control mechanism information, and the configuration information included in the first information according to priorities (S1330).

According to an embodiment, among the priorities, a first priority may be the match of the access classes, a second priority may be the match of the configuration information, and a third priority may be the match of EAB information of the access control mechanism information, and a fourth priority may be the match of ACDC information of the access control mechanism information. However, according to embodiments, the priorities may be changed. The remote UE may sequentially check the first to fourth priorities using preset priorities and may select a relay UE to attempt to connect to.

Figure 13B:
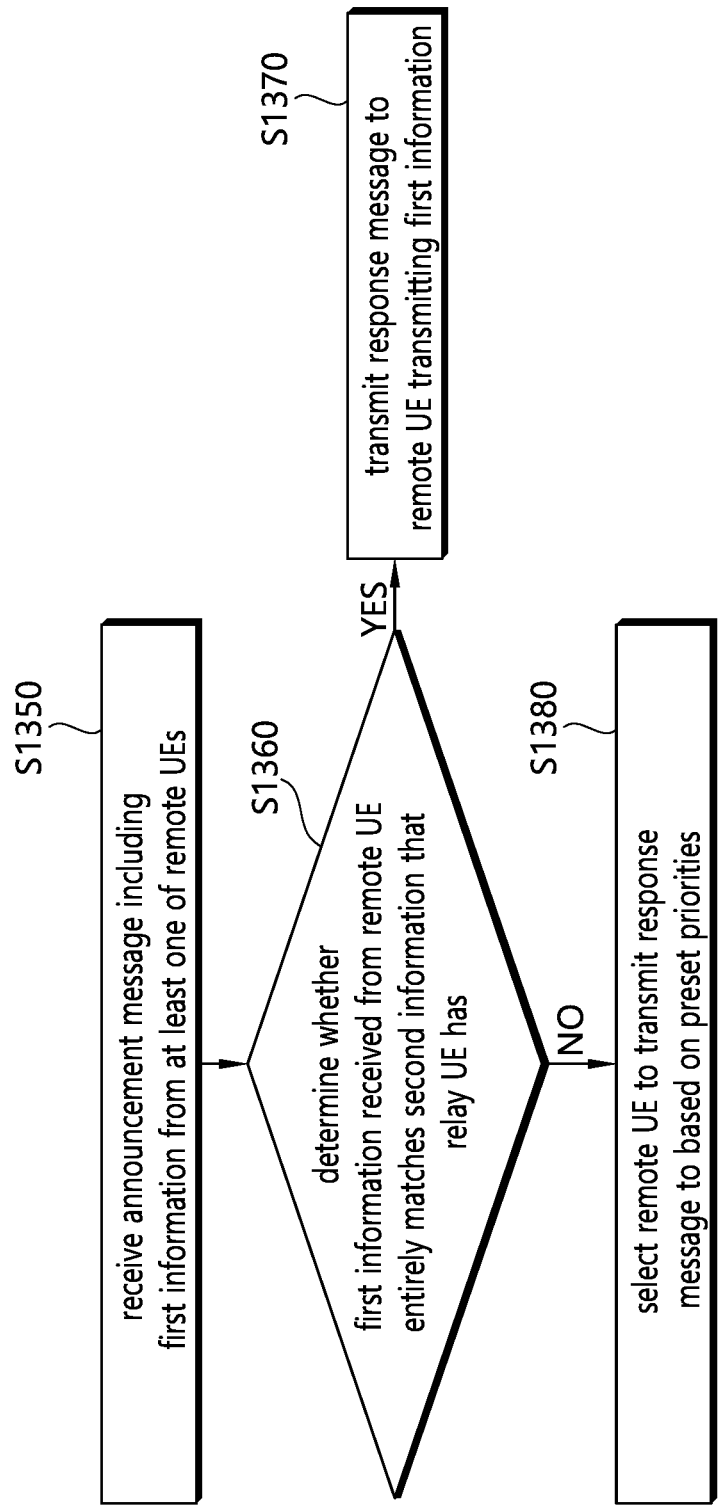
FIG. 13b is a flowchart illustrating a process for a relay UE to select a remote UE to which the relay UE transmits a response message when access control is applied due to network congestion according to an embodiment of the present invention.

FIG. 13b is a flowchart illustrating a process for a relay UE to select a remote UE to which the relay UE transmits a response message when access control is applied due to network congestion according to an embodiment of the present invention.

Referring to FIG. 13b, a relay UE may receive an announcement message including first information from at least one remote UE (S1350). According to an embodiment, the announcement message may be a PC5 solicitation message. The first information may include access class information on the remote UE, access control mechanism information on the remote UE, and configuration information on the remote UE.

The relay UE may compare the first information with second information that the relay UE has (S1360). The second information may include may include access class information on the relay UE, access control mechanism information on the relay UE, and configuration information on the relay UE.

When the first information entirely matches the second information (YES in S1360), the relay UE may transmit a response message to a remote UE that has transmitted the matching first information among the remote UEs (S1370). According to an embodiment, the response message may be a PC5 response message.

When the information included in the first information does not entirely match the information included in the second information (NO in S1360), the relay UE may transmit a response message to a remote UE corresponding to one or some of the access class information, the access control mechanism information, and the configuration information included in the first information according to priorities (S1380).

According to an embodiment, among the priorities, a first priority may be the match of the access classes, a second priority may be the match of the configuration information, and a third priority may be the match of EAB information of the access control mechanism information, and a fourth priority may be the match of ACDC information of the access control mechanism information. However, according to embodiments, the priorities may be changed. The remote UE may sequentially check the first to fourth priorities using preset priorities and may select a relay UE to attempt to connect to.

Details mentioned so far may be implemented by hardware.

Figure 14:
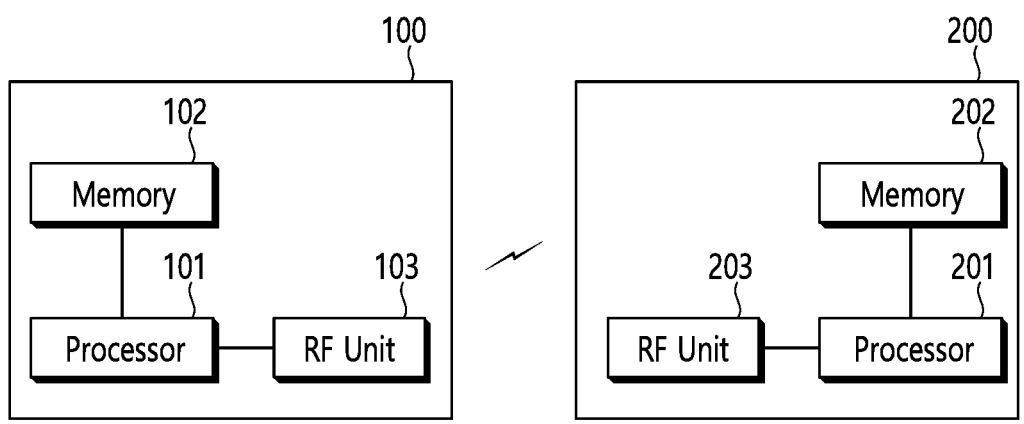
FIG. 14 is a block diagram illustrating a wireless communication system that implements the embodiments of the present invention.

FIG. 14 is a block diagram illustrating a wireless communication system that implements the embodiments of the present invention.

A BS 200 includes a processor 201, a memory 202 and an RF unit 203. The memory 202 is connected to the processor 201, and stores various pieces of information for driving the processor 201. The RF unit 203 is connected to the processor 201, and transmits and/or receives radio signals. The processor 201 implements proposed functions, processes and/or methods. In the above embodiment, an operation of the BS may be implemented by the processor 201.

A wireless device 100 includes a processor 101, a memory 102 and an RF unit 103. The memory 102 is connected to the processor 101, and stores various pieces of information for driving the processor 101. The RF unit 103 is connected to the processor 101, and transmits and/or receives radio signals. The processor 101 implements proposed functions, processes and/or methods. In the above embodiment, an operation of the wireless device may be implemented by the processor 101.

The processor may include an application-specific integrated circuit (ASIC), a separate chipset, a logic circuit, and/or a data processing unit. The memory may include a read-only memory (ROM), a random access memory (RAM), a flash memory, a memory card, a storage medium, and/or other equivalent storage devices. The RF unit may include a base-band circuit for processing a wireless signal. When the embodiment is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for selecting one of a plurality of remote user equipment (UE) when an access class barring for an access control mechanism is applied due to network congestion, the method performed by a relay UE and comprising:
   receiving, by the relay UE, an announcement message comprising first information related to a first access class barring for the access control mechanism, from at least one of the plurality of remote UEs,
   wherein the relay UE has second information related to a second access class barring for the access control mechanism,
   wherein each of the first and second information comprises at least three kinds of information including access class information, access control mechanism information and configuration information,
   wherein the access control mechanism information represents at least one of an access class barring (ACB) mechanism, an Extended Access Barring (EAB) mechanism and an Application specific Congestion control for Data Communication (ACDC) mechanism,
   comparing, by the relay UE, the first information of the at least one of the remote UEs with the second information of the relay UE;
   selecting, by the relay UE, a first remote UE among the plurality of remote UEs, based on the first remote UE having transmitted the first information including the at least three kinds of information which completely match the at least three kinds of information in the second information of the relay UE; and
   transmitting a response message to the selected first remote UE.

2. The method of claim 1, further comprising:
   selecting a second remote UE among the remote UEs according to a priority, based on the remote UE having transmitted the first information including the at least three kinds of the information which are partially identical to the at least three kinds of information included in the second information of the relay UE.

3. The method of claim 2, wherein the priority indicates an order of determining whether the access class information, the access control mechanism information, and the configuration information comprised in the second information match those of the first information.

4. The method of claim 2, wherein the second remote UE is selected based on whether the second remote UE has the same access class information as that of the relay UE and based on the priority.

5. The method of claim 1, wherein the second remote UE is selected based on whether the second remote UE does not have the same access class information as that of the relay UE, but has the same configuration information as that of the relay UE, and
   wherein the configuration information comprises at least one of a non-access stratum (NAS) signaling low priority indicator and an overriding NAS signaling low priority indicator.

6. The method of claim 1, wherein the second remote UE is selected based on whether the second remote UE has the same extended access barring (EAB) information as that of the relay UE.

7. The method of claim 1, wherein the second remote UE is selected based on whether the second remote LIE does have the same extended access barring (EAB) information as that of the relay UE, but has the same application-specific congestion control for data communication (ACDC) information as that of the relay UE.

8. The method of claim 1, wherein the response message comprises one or more of information on access control, information on a start of access control, and the second information, and any one piece of the response message is used to report to the remote UE that access control is started by the relay UE.

9. The method of claim 8, wherein even though the first or second remote UE is selected by the relay UE, the first or second remote UE selects a different relay UE, other than the relay LIE, based on any one piece of information in the response message.

10. The method of claim 1, wherein the first information comprises a first relay service code and a first user information identifier (ID) of the remote UE, and the second information comprises a second relay service code and a second user information ID of the relay UE.

11. The method of claim 1, wherein the first remote UE is selected based on a highest signal strength from among a plurality of remote UEs transmitting the first information entirely matching the second information when there is the plurality of remote UEs transmitting the first information.

12. The method of claim 1, wherein the first remote UE is selected based on a policy of a service provider or a configuration of a network when there is a plurality of remote UEs transmitting the first information entirely matching the second information.

13. A relay user equipment (UE) selecting one of a plurality of remote UEs when an access class barring for an access control mechanism is applied due to network congestion, the relay UE comprising:
   a receiver to receive an announcement message comprising first information related to a first access class barring for the access control mechanism from at least one of the remote UEs and a transmitter to transmit a response message to a selected remote UE; and
   a processor to control the transmitter and receiver,
   wherein the processor:
      compares the first information of the at least one of the plurality of remote UEs with second information of the relay UE;
      wherein each of the first and second information comprises at least three kinds of information including access class information, access control mechanism information and configuration information, wherein the access control mechanism information represents at least one of an access class barring (ACB) mechanism, an Extended Access Barring (EAB) mechanism and an Application specific Congestion control for Data Communication (ACDC) mechanism;

selects a first remote UE among the plurality of remote UEs, based on the remote UE having transmitted the first information including the at least three kinds of information which completely match the at least three kinds of information in the second information of the relay UE.

\* \* \* \* \*